US011861784B2

(12) United States Patent
Chong et al.

(10) Patent No.: US 11,861,784 B2
(45) Date of Patent: Jan. 2, 2024

(54) DETERMINATION OF AN OPTIMAL SPATIOTEMPORAL SENSOR CONFIGURATION FOR NAVIGATION OF A VEHICLE USING SIMULATION OF VIRTUAL SENSORS

(71) Applicant: Motional AD LLC, Boston, MA (US)

(72) Inventors: Zi Yi Chong, Singapore (SG); Maurilio Di Cicco, Singapore (SG)

(73) Assignee: Motional AD LLC, Boston, MA (US)

( * ) Notice: Subject to any disclaimer, the term of this patent is extended or adjusted under 35 U.S.C. 154(b) by 329 days.

(21) Appl. No.: 16/704,007

(22) Filed: Dec. 5, 2019

(65) Prior Publication Data

US 2020/0193686 A1 Jun. 18, 2020

Related U.S. Application Data

(60) Provisional application No. 62/779,965, filed on Dec. 14, 2018.

(51) Int. Cl.
*G06T 15/06* (2011.01)
*G06T 7/70* (2017.01)
(Continued)

(52) U.S. Cl.
CPC .............. *G06T 15/06* (2013.01); *G01S 17/89* (2013.01); *G06T 7/70* (2017.01); *G06T 17/05* (2013.01); *G06T 2207/30248* (2013.01)

(58) Field of Classification Search
CPC ...................................................... G06T 15/06
(Continued)

(56) References Cited

U.S. PATENT DOCUMENTS

2015/0310281 A1 10/2015 Zhu et al.
2016/0210775 A1* 7/2016 Alaniz ................. G05D 1/0088
(Continued)

FOREIGN PATENT DOCUMENTS

CN 108304605 7/2018
DE 102010037359 3/2012

OTHER PUBLICATIONS

Bhadani et al., "The CAT Vehicle Testbed: A Simulator with Hardware in the Loop for Autonomous Vehicle Applications," 2nd International Workshop on Safe Control of Autonomous Vehicles, Apr. 12, 2018, 16 pages.
(Continued)

*Primary Examiner* — Shivang I Patel
(74) *Attorney, Agent, or Firm* — Fish & Richardson P.C.

(57) ABSTRACT

Techniques for determination of an optimal spatiotemporal sensor configuration for navigation of a vehicle include generating a model of a virtual vehicle operating in an environment. The model of the virtual vehicle includes a virtual sensor having a virtual viewing range. The virtual viewing range of the virtual sensor is segregated into frustums. The virtual viewing range of the virtual sensor corresponds to a viewing range of a sensor of a vehicle operating in the environment. A geometric viewport is generated including pixels. The geometric viewport has a height corresponding to a number of rays emitted from the virtual sensor. The geometric viewport is segregated into sections. Each section corresponds to a frustum. A virtual point cloud of the virtual sensor is rendered. The virtual point cloud includes coordinate positions representing a portion of the environment located within the virtual viewing range of the virtual sensor.

20 Claims, 18 Drawing Sheets

(51) Int. Cl.
 *G01S 17/89* (2020.01)
 *G06T 17/05* (2011.01)
(58) Field of Classification Search
 USPC .......................................................... 345/419
 See application file for complete search history.

(56) References Cited

U.S. PATENT DOCUMENTS

2018/0203445 A1  7/2018  Micks et al.
2018/0275658 A1  9/2018  Iandola et al.
2018/0349746 A1* 12/2018  Vallespi-Gonzalez ......................
                                                                G01S 17/89

OTHER PUBLICATIONS

Best et al. "Autono Vi-Sim: Autonomous Vehicle Simulation Platform with Weather, Sensing, and Traffic Control," In Proceedings of the IEEE Conference on Computer Vision and Pattern Recognition Workshops, Jun. 18, 2018, pp. 1161-11618.
DK 3rd Technical Examination in Danish Patent Appln. No. PA201970129, dated Jul. 10, 2020, 3 pages.
Dosovitskiy, "CARLA: An Open Urban Driving Simulator," 1rst Conference of Robot Learning, Nov. 10, 2018, 16 pages.
PCT International Search Report and Written Opinion in International Appln. No. PCT/IB2019/060473, dated Feb. 2, 2020 11 pages.
[No Author Listed] "SAE: International Surface Vehicle Recommended Practice: Taxonomy and Definitions for Terms Related to Driving Automation Systems for On-Road Moto Vehicles," Sep. 30, 2016, 30 pages.
DK 1rst Technical Examination in Danish Patent Appln. PA201970129, dated Jun. 20, 2019, 10 pages.
DK 2nd Technical Examination in Danish Patent Appln. PA201970129, dated Jan. 30, 2020, 6 pages.
PCT International Preliminary Report on Patentability in International Appln. No. PCT/IB2019/060473, dated Jun. 24, 2021, 9 pages.

* cited by examiner

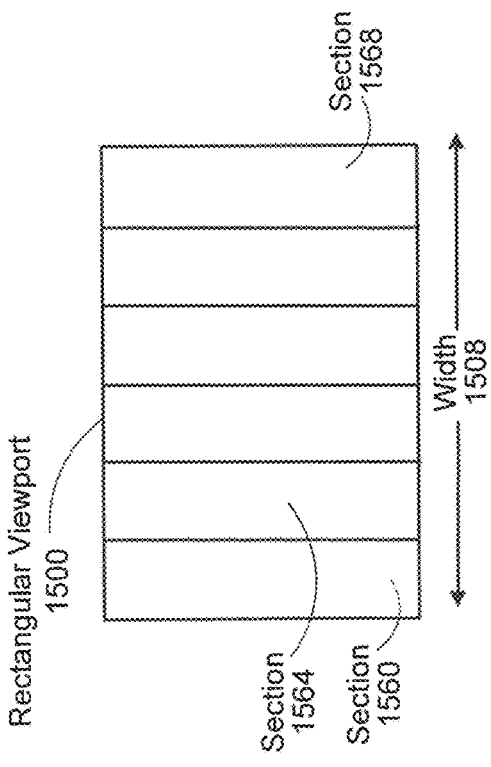
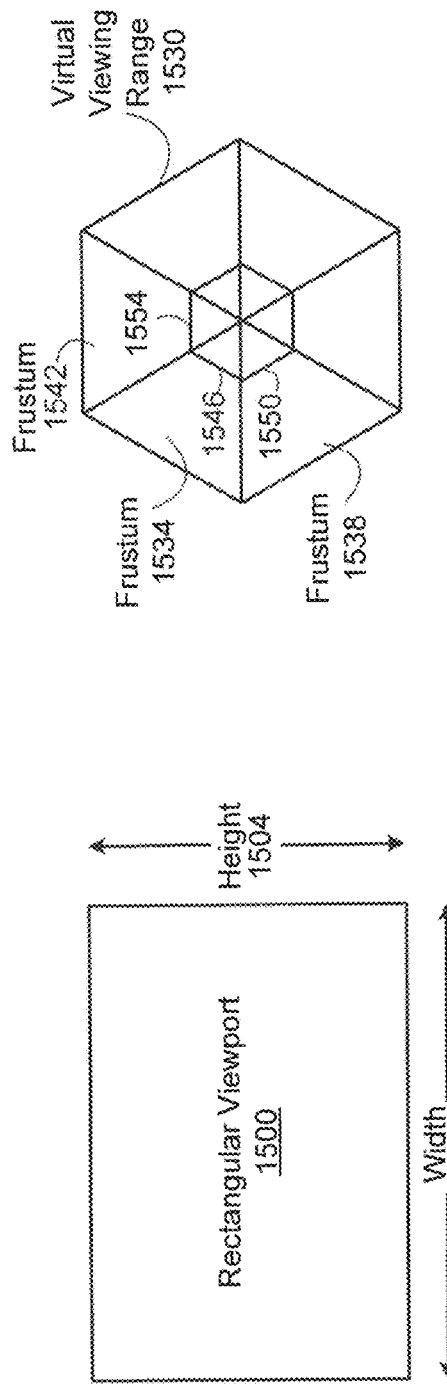
FIG. 15A
FIG. 15B
FIG. 15C

1700

```
┌─────────────────────────────────────────────────────────────────────┐
│ Generate a model of a virtual vehicle operating in an environment,  │
│ wherein the model of the virtual vehicle comprises a virtual sensor │
│ having a virtual viewing range                                       │
│ 1704                                                                 │
└─────────────────────────────────────────────────────────────────────┘
                                  ↓
┌─────────────────────────────────────────────────────────────────────┐
│ Segregate the virtual viewing range of the virtual sensor into a    │
│ plurality of frustums, wherein the virtual viewing range of the     │
│ virtual sensor corresponds to a viewing range of a sensor of a      │
│ vehicle operating in the environment                                 │
│ 1708                                                                 │
└─────────────────────────────────────────────────────────────────────┘
                                  ↓
┌─────────────────────────────────────────────────────────────────────┐
│ Generate a geometric viewport comprising a plurality of pixels,     │
│ wherein the geometric viewport has a height corresponding to a      │
│ number of rays emitted from the virtual sensor                       │
│ 1712                                                                 │
└─────────────────────────────────────────────────────────────────────┘
                                  ↓
┌─────────────────────────────────────────────────────────────────────┐
│ Segregate the geometric viewport into a plurality of sections,      │
│ wherein each section of the plurality of sections corresponds to a  │
│ frustum of the plurality of frustums                                 │
│ 1716                                                                 │
└─────────────────────────────────────────────────────────────────────┘
                                  ↓
┌─────────────────────────────────────────────────────────────────────┐
│ Render a virtual point cloud of the virtual sensor, wherein the     │
│ virtual point cloud comprises a plurality of coordinate positions   │
│ representing a portion of the environment located within the        │
│ virtual viewing range of the virtual sensor                         │
│ 1720                                                                 │
└─────────────────────────────────────────────────────────────────────┘
                                  ↓
┌─────────────────────────────────────────────────────────────────────┐
│ Determine, based on the virtual point cloud of the virtual sensor,  │
│ a spatiotemporal configuration of the sensor of the vehicle         │
│ 1724                                                                 │
└─────────────────────────────────────────────────────────────────────┘
```

```
┌─────────────────────────────────────────────────────────────┐
│ Receive, using one or more processors, data describing an   │
│ environment in which a vehicle is operating                 │
│                         1804                                │
└─────────────────────────────────────────────────────────────┘
                              ↓
┌─────────────────────────────────────────────────────────────┐
│ For each sensor of a plurality of sensors of the vehicle:   │
│ generate, using the one or more processors, a model of a    │
│ virtual vehicle operating in the environment, wherein the   │
│ model of the virtual vehicle comprises a virtual sensor     │
│ corresponding to the sensor                                 │
│                         1808                                │
└─────────────────────────────────────────────────────────────┘
                              ↓
┌─────────────────────────────────────────────────────────────┐
│ Render, using the received data describing the environment, │
│ a virtual point cloud of the virtual sensor                 │
│                         1812                                │
└─────────────────────────────────────────────────────────────┘
                              ↓
┌─────────────────────────────────────────────────────────────┐
│ Determine, using the virtual point cloud, a quality metric  │
│ of the virtual sensor, wherein the quality metric comprises │
│ at least one of a range of the virtual sensor or a          │
│ visibility of the virtual sensor                            │
│                         1816                                │
└─────────────────────────────────────────────────────────────┘
                              ↓
┌─────────────────────────────────────────────────────────────┐
│ Select, using the plurality of quality metrics, an optimal  │
│ sensor of the plurality of sensors for operating the        │
│ vehicle within the environment                              │
│                         1820                                │
└─────────────────────────────────────────────────────────────┘
```

FIG. 18

DETERMINATION OF AN OPTIMAL SPATIOTEMPORAL SENSOR CONFIGURATION FOR NAVIGATION OF A VEHICLE USING SIMULATION OF VIRTUAL SENSORS

CROSS-REFERENCE TO RELATED APPLICATION

This application claims the benefit of U.S. Provisional Application 62/779,965, filed on Dec. 14, 2018, which is incorporated herein by reference in its entirety.

FIELD OF THE INVENTION

This description relates generally to sensor configuration design for vehicles and specifically to determination of an optimal spatiotemporal sensor configuration for navigation of a vehicle using simulation of virtual sensors.

BACKGROUND

Traditional methods for vehicular design often use remote sensing devices such as LIDARs to measure a distance from an object in an environment to the devices. However, conventional methods for vehicular design and verification using sensors may not be practical in complex and dense environments because LIDAR sensors are expensive to manufacture and test extensively. Moreover, conventional methods for sensor design and placement often rely on polygon intersection methods that may not be optimal in realistic environments because of the large number of polygonal geometries.

SUMMARY

Techniques are provided for determination of an optimal spatiotemporal sensor configuration for navigation of a vehicle using simulation of virtual sensors. The techniques include generating, using one or more processors, a model of a virtual vehicle operating in an environment. The model of the virtual vehicle includes a virtual sensor having a virtual viewing range. Using the one or more processors, the virtual viewing range of the virtual sensor is segregated into a plurality of frustums. The virtual viewing range of the virtual sensor corresponds to a viewing range of a sensor of a vehicle operating in the environment. Using the one or more processors, a geometric viewport is generated including a plurality of pixels. The geometric viewport has a height corresponding to a number of rays emitted from the virtual sensor. Using the one or more processors, the geometric viewport is segregated into a plurality of sections. Each section of the plurality of sections corresponds to a frustum of the plurality of frustums. Using the one or more processors, a virtual point cloud of the virtual sensor is generated. The virtual point cloud includes a plurality of coordinate positions representing a portion of the environment located within the virtual viewing range of the virtual sensor.

In one embodiment, based on the virtual point cloud of the virtual sensor, a spatiotemporal configuration of the sensor of the vehicle is determined.

In one embodiment, using the one or more processors, virtual point clouds of virtual sensors of the virtual vehicle are rendered. Using the one or more processors, the virtual point clouds are aggregated into an aggregate virtual point cloud. The aggregate virtual point cloud represents a portion of the environment located within a virtual viewing range of the sensors. Based on the aggregate virtual point cloud, a spatiotemporal configuration of sensors of the vehicle is determined, wherein each sensor corresponds to a virtual sensor.

In one embodiment, based on the virtual point cloud of the virtual sensor, a blind spot of the sensor of the vehicle is determined, wherein the blind spot includes a spatiotemporal location of the environment.

In one embodiment, an object is located at the blind spot and the coordinate positions are free of the object.

In one embodiment, the viewing range of the sensor of the vehicle is extended based on analyzing the virtual point cloud data of the virtual sensor.

In one embodiment, the sensor includes at least one of a LIDAR, a monocular video camera, a stereo video camera, an infrared camera, a RADAR, an ultrasonic sensor, or a time-of-flight (TOF) depth sensor.

In one embodiment, the sensor is one of several sensors located on the vehicle and arranged in a spatiotemporal configuration.

In one embodiment, the spatiotemporal configuration is one of several spatiotemporal configurations. The method further includes for each spatiotemporal configuration of the several spatiotemporal configurations, rendering a raster image representing the coordinate positions. An optimal spatiotemporal configuration of the several spatiotemporal configurations is determined based on the plurality of raster images.

In one embodiment, each raster image includes the pixels of the geometric viewport and represents coordinate positions of an object located within the environment.

In one embodiment, a raster image representing the coordinate positions of the object located within the environment is transmitted to a display device of the vehicle.

In one embodiment, the rendering of the raster image includes receiving, using the sensor, sensor data representing coordinate positions of the object. Using the one or more processors, pixels representing the object are generated. The sensor data is combined with the pixels to generate the raster image.

In one embodiment, the sensor data includes LIDAR point cloud data.

In one embodiment, the geometric viewport has a width that increases as a number of the frustums increases.

In one embodiment, the rendering of the raster image is based on a geometric position and directional orientation of the sensor relative to the coordinate positions of the object.

In one embodiment, the raster image includes a two-dimensional cylindrical representation of a surface of the object.

In one embodiment, the segregating of the geometric viewport into the sections includes mapping a near plane of each frustum onto a corresponding section.

In one embodiment, using the coordinate positions of the object in the raster image, a distance from the vehicle to the object is determined. Using a control module of the vehicle, the vehicle is navigated to avoid collisions with the object based on the distance.

In one embodiment, using the raster image, a reflectance of a surface of the object is determined. Using a control module of the vehicle, the vehicle is navigated to avoid a collision of the vehicle with the object based on the reflectance.

In one embodiment, a distinct raster image representing the object is rendered onto the geometric viewport. A representational quality of the distinct raster image associated with the reflectance of a surface of the object is determined.

In one embodiment, a vehicle includes one or more computer processors and one or more non-transitory storage media storing instructions which, when executed by the one or more computer processors, cause performance of any one of the methods disclosed herein.

In one embodiment, one or more non-transitory storage media store instructions which, when executed by one or more computing devices, cause performance of any one of the methods disclosed herein.

In one embodiment, a method includes performing a machine-executed operation involving instructions which, when executed by one or more computing devices, cause performance of any one of the methods disclosed herein, wherein the machine-executed operation is at least one of sending said instructions, receiving said instructions, storing said instructions, or executing said instructions.

In one embodiment, a vehicle includes one or more processors configured to generate a model of a virtual vehicle operating in an environment. A virtual viewing range of a virtual sensor of the virtual vehicle is segregated into frustums. The virtual viewing range of the virtual sensor corresponds to a viewing range of a sensor of the vehicle operating in the environment. A geometric viewport is generated including pixels, wherein the geometric viewport has a height corresponding to a number of rays emitted from the virtual sensor. The geometric viewport is segregated into sections, wherein each section corresponds to a frustum. A virtual point cloud of the virtual sensor is generated, wherein the virtual point cloud includes coordinate positions representing a portion of the environment located within the virtual viewing range of the virtual sensor.

In one embodiment, one or more processors receive data describing an environment in which a vehicle is operating. For each sensor of a plurality of sensors of the vehicle, the one or more processors generate a model of a virtual vehicle operating in the environment. The model of the virtual vehicle includes a virtual sensor corresponding to the sensor. Using the received data describing the environment, a virtual point cloud of the virtual sensor is rendered. Using the virtual point cloud, a quality metric of the virtual sensor is determined. The quality metric includes a range of the virtual sensor or a visibility of the virtual sensor. Using the plurality of quality metrics, an optimal sensor of the plurality of sensors for operating the vehicle within the environment is selected.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 15A illustrates a geometric viewport for determination of an optimal spatiotemporal sensor configuration for navigation of an AV using simulation of virtual sensors, in accordance with one or more embodiments.

FIG. 15B illustrates a virtual viewing range for determination of an optimal spatiotemporal sensor configuration for navigation of an AV using simulation of virtual sensors, in accordance with one or more embodiments.

FIG. 15C illustrates segregation of a geometric viewport for determination of an optimal spatiotemporal sensor configuration for navigation of an AV using simulation of virtual sensors, in accordance with one or more embodiments.

FIG. 17 illustrates a process for determination of an optimal spatiotemporal sensor configuration for navigation of an AV using simulation of virtual sensors, in accordance with one or more embodiments.

FIG. 18 illustrates a process for determining an optimal sensor for navigation of an AV using simulation of virtual sensors, in accordance with one or more embodiments.

DETAILED DESCRIPTION

Figure 1:
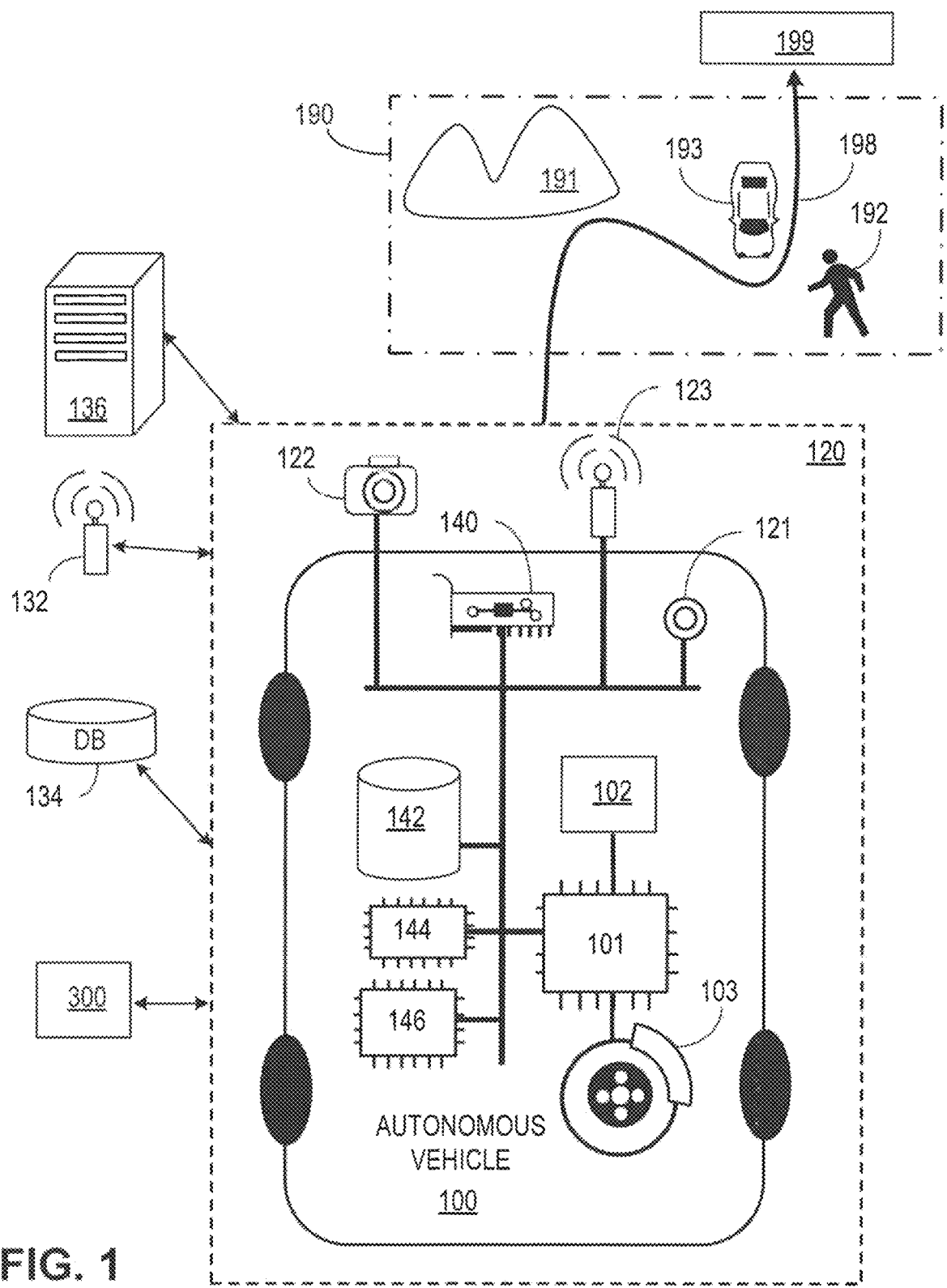
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Environment for Determining Optimal Sensors
8. Architecture for Determining Optimal Sensors
9. Examples of Determining Optimal Sensors
10. Processes for Determining Optimal Sensors General Overview An autonomous vehicle (AV) uses sensors to detect objects and determine distances from objects during navigation within an environment. The sensors include visual sensors such as cameras and LIDAR. A LIDAR is a remote sensing device that uses a grid of pulsed laser beams to measure a distance from an object to the device, a direction in which the object lies, as well as a reflectance of a surface of the object. In embodiments herein, different types of sensors and LIDAR devices are simulated using a model of a virtual AV in a controlled environment to improve the accuracy of LIDAR operation, increase the fidelity of the simulation scenarios, and derive more meaningful results from simulation miles driven by the AV.

The method generates a simulated point cloud of a spinning LIDAR using image rasterization. One or more processors define a size of a rectangular output viewport in pixels. The viewport has a height corresponding to a number of rays emitted by the LIDAR. The viewport has a width corresponding to a density of the LIDAR simulation. A viewing range of the LIDAR is subdivided into frustums. A number of the frustums is defined corresponding to an accuracy of the simulation. The viewport is also subdivided by the number of frustums. The method maps a near plane of each frustum onto a corresponding section on the viewport. World coordinate positions of the environmental geometry are interpolated and rendered onto the viewport using rasterization. The resulting render is a 360° cylindrical view wrapped onto a 2D surface. The resulting render contains the simulated LIDAR point cloud values, which are used for determination of an optimal spatiotemporal sensor configuration for navigation of the AV.

System Overview

FIG. 1 illustrates an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LIDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
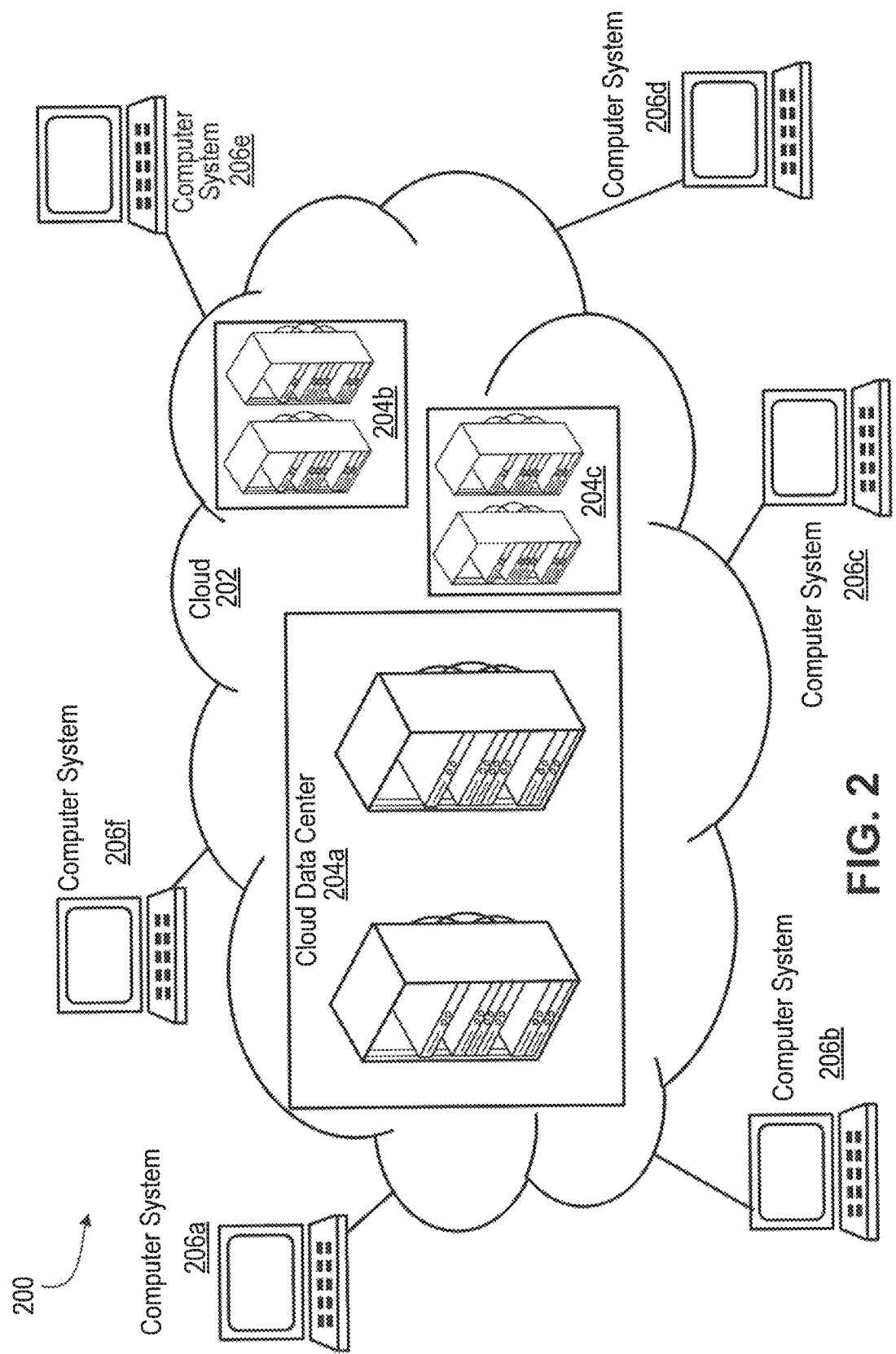
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
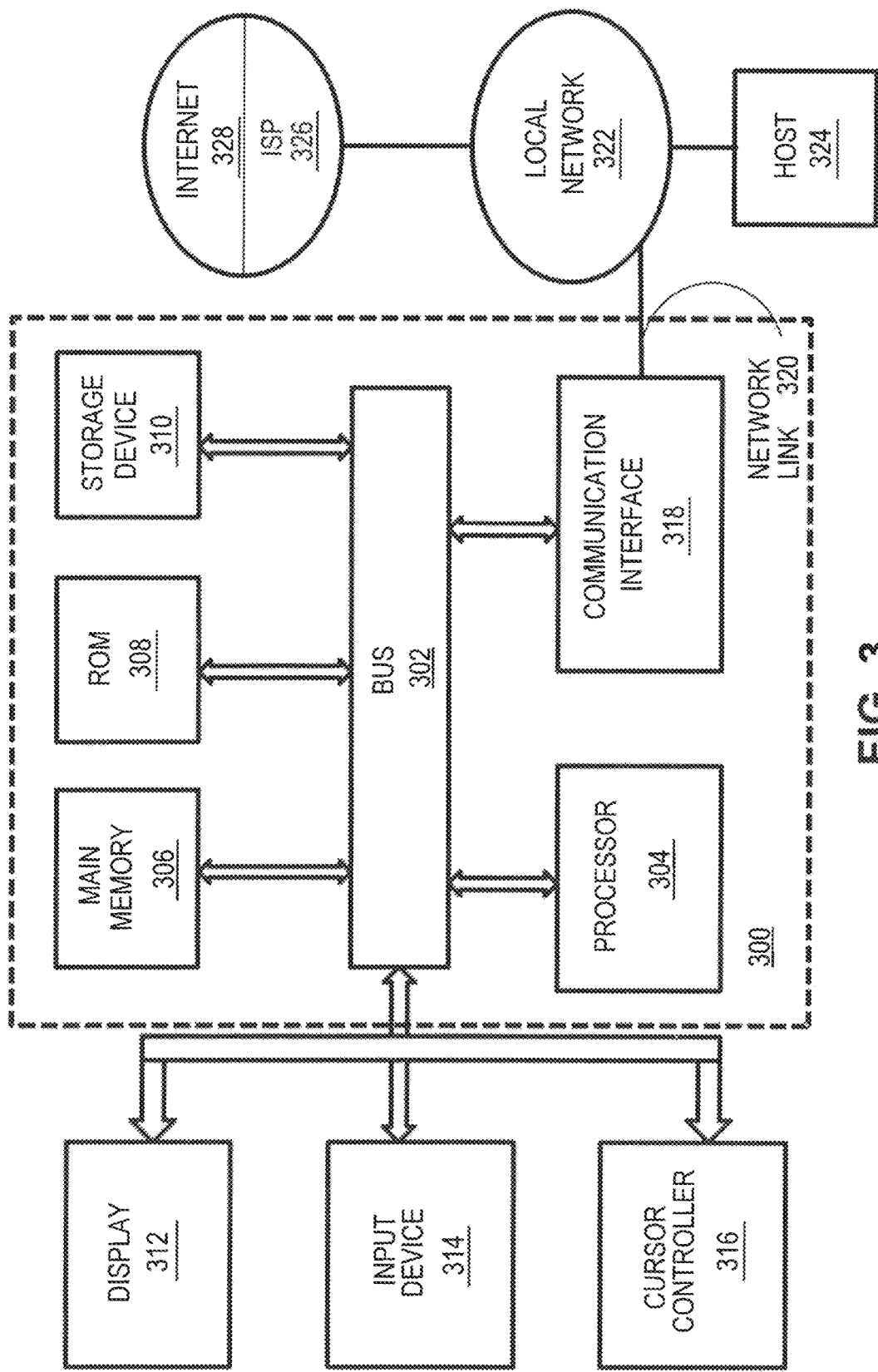
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
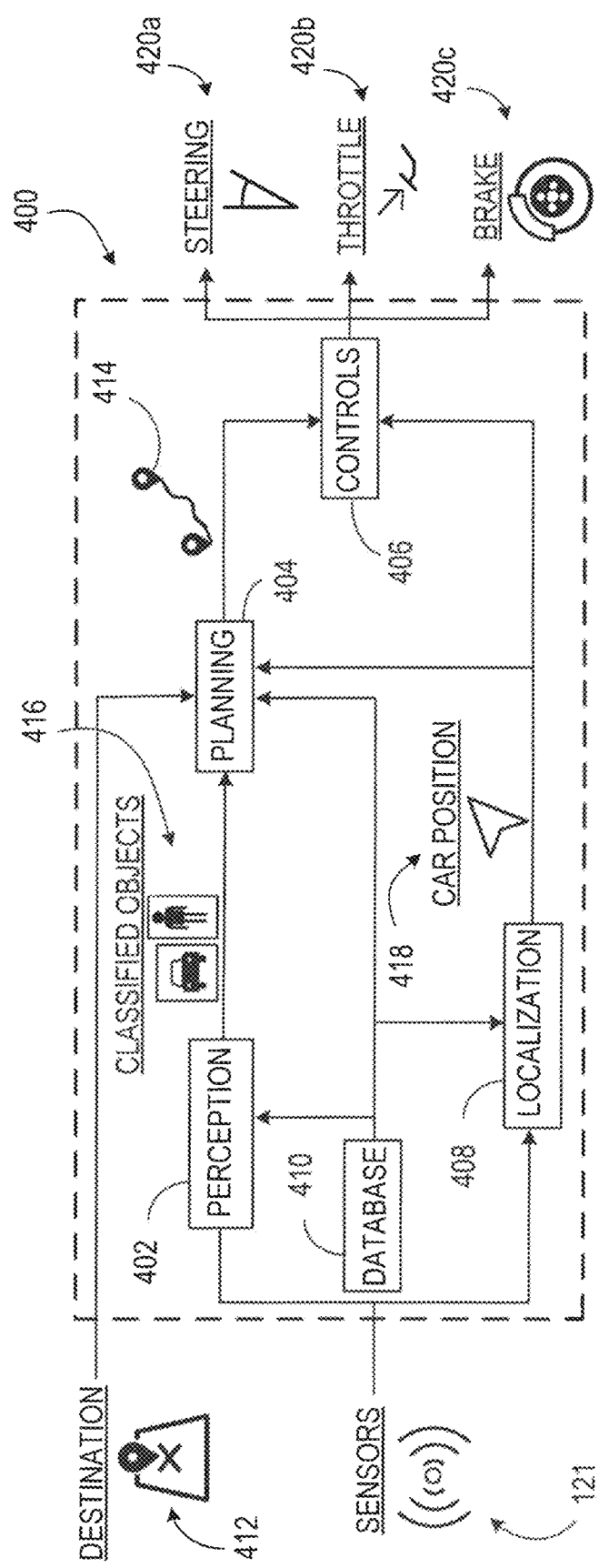
FIG. 4 illustrates an example architecture for an AV, in accordance with one or more embodiments.

FIG. 4 illustrates an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
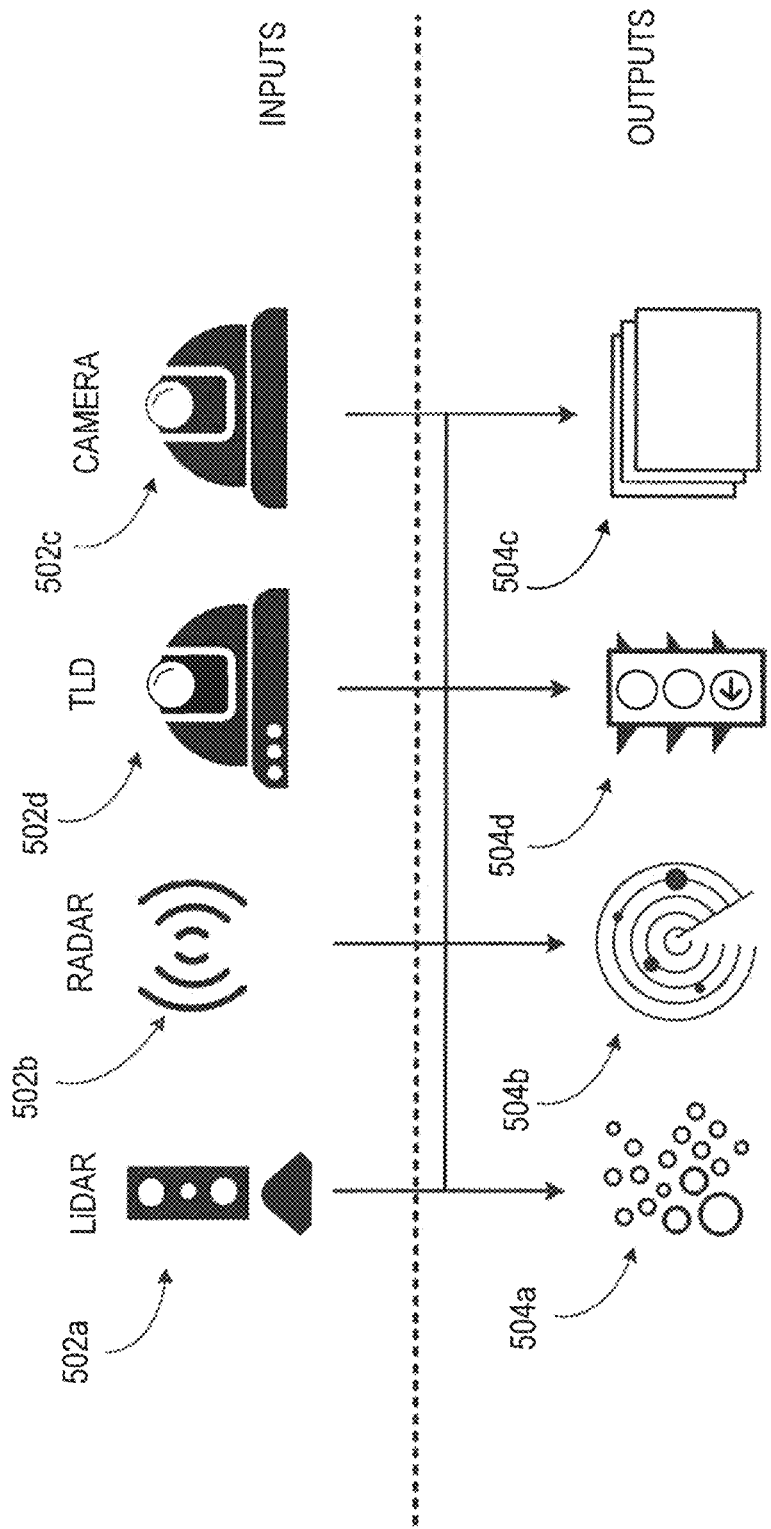
FIG. 5 illustrates an example of inputs and outputs that may be used by a perception module, in accordance with one or more embodiments.

FIG. 5 illustrates an example of inputs 502a-d (e.g., sensors 121 shown in FIG. 1) and outputs 504a-d (e.g., sensor data) that is used by the perception module 402 (FIG. 4). One input 502a is a LIDAR (Light Detection and Ranging) system (e.g., LIDAR 123 shown in FIG. 1). LIDAR is a technology that uses light (e.g., bursts of light such as infrared light) to obtain data about physical objects in its line of sight. A LIDAR system produces LIDAR data as output 504a. For example, LIDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LIDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
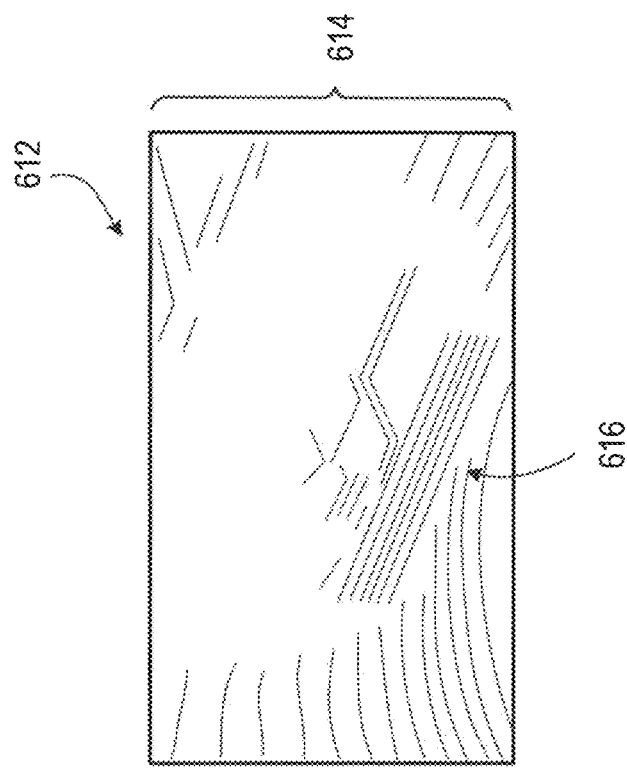
FIG. 6 illustrates an example of a LIDAR system, in accordance with one or more embodiments.
Figure 6:
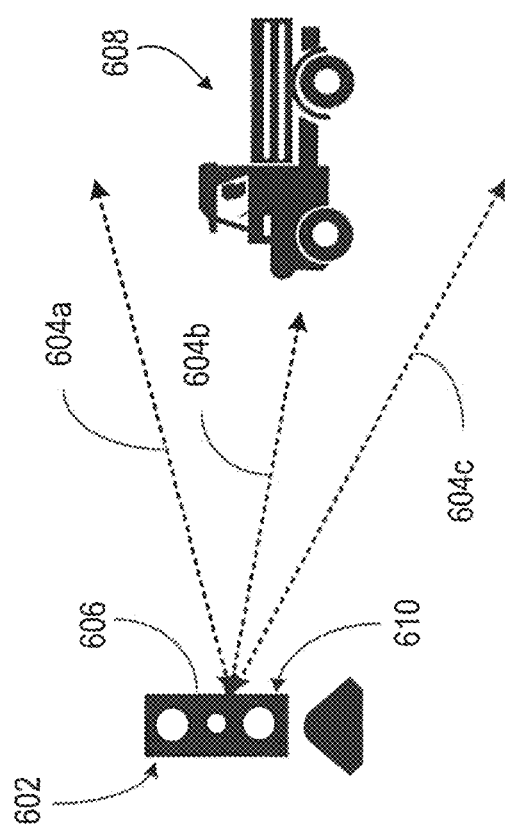

FIG. 6 illustrates an example of a LIDAR system 602 (e.g., the input 502*a* shown in FIG. 5). The LIDAR system 602 emits light 604*a-c* from a light emitter 606 (e.g., a laser transmitter). Light emitted by a LIDAR system is typically not in the visible spectrum; for example, infrared light is often used. Some of the light 604*b* emitted encounters a physical object 608 (e.g., a vehicle) and reflects back to the LIDAR system 602. (Light emitted from a LIDAR system typically does not penetrate physical objects, e.g., physical objects in solid form.) The LIDAR system 602 also has one or more light detectors 610, which detect the reflected light. In an embodiment, one or more data processing systems associated with the LIDAR system generates an image 612 representing the field of view 614 of the LIDAR system. The image 612 includes information that represents the boundaries 616 of a physical object 608. In this way, the image 612 is used to determine the boundaries 616 of one or more physical objects near an AV.

Figure 7:
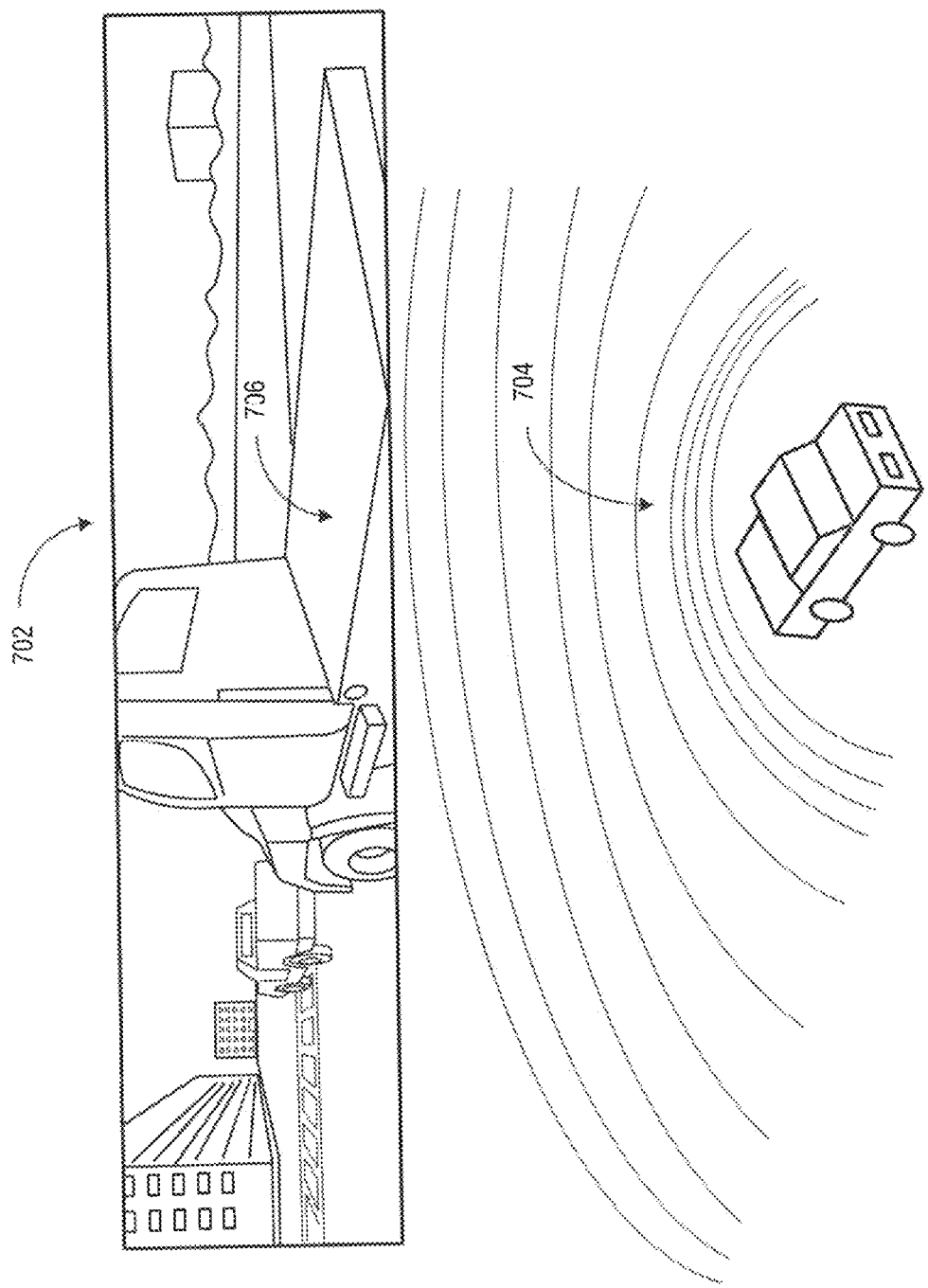
FIG. 7 illustrates the LIDAR system in operation, in accordance with one or more embodiments.

FIG. 7 illustrates the LIDAR system 602 in operation. In the scenario shown in this figure, the AV 100 receives both camera system output 504*c* in the form of an image 702 and LIDAR system output 504*a* in the form of LIDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
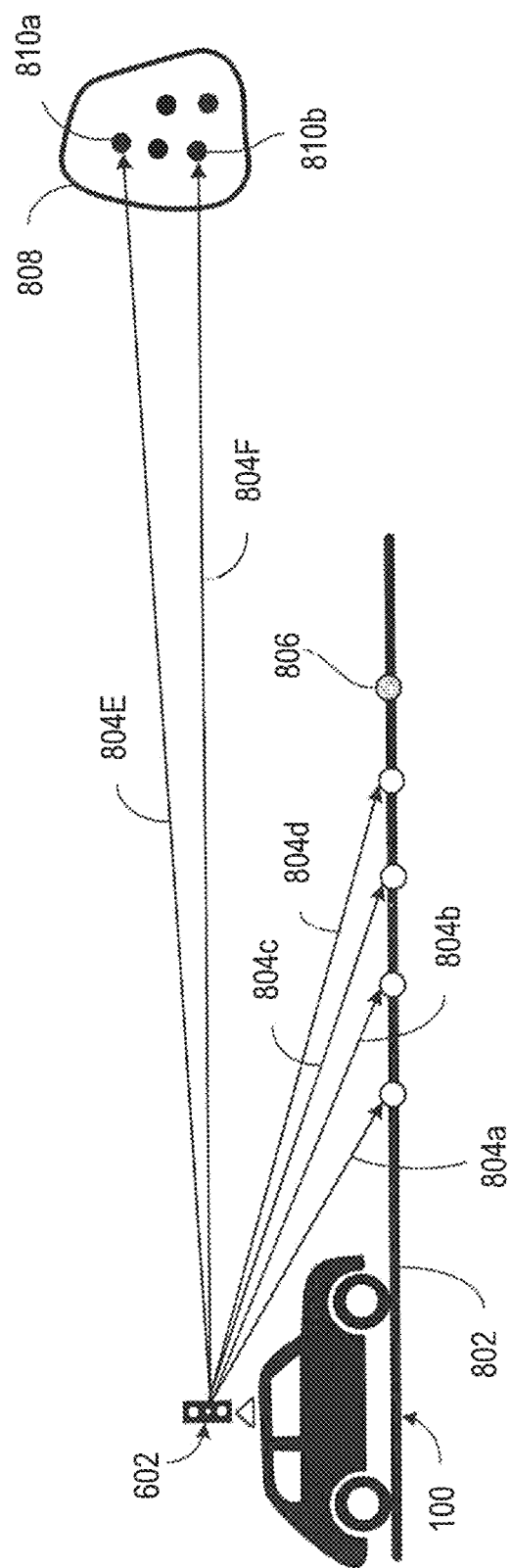
FIG. 8 illustrates the operation of the LIDAR system in additional detail, in accordance with one or more embodiments.

FIG. 8 illustrates the operation of the LIDAR system 602 in additional detail. As described above, the AV 100 detects the boundary of a physical object based on characteristics of the data points detected by the LIDAR system 602. As shown in FIG. 8, a flat object, such as the ground 802, will reflect light 804*a-d* emitted from a LIDAR system 602 in a consistent manner. Put another way, because the LIDAR system 602 emits light using consistent spacing, the ground 802 will reflect light back to the LIDAR system 602 with the same consistent spacing. As the AV 100 travels over the ground 802, the LIDAR system 602 will continue to detect light reflected by the next valid ground point 806 if nothing is obstructing the road. However, if an object 808 obstructs the road, light 804*e-f* emitted by the LIDAR system 602 will be reflected from points 810*a-b* in a manner inconsistent with the expected consistent manner. From this information, the AV 100 can determine that the object 808 is present.

Path Planning

Figure 9:
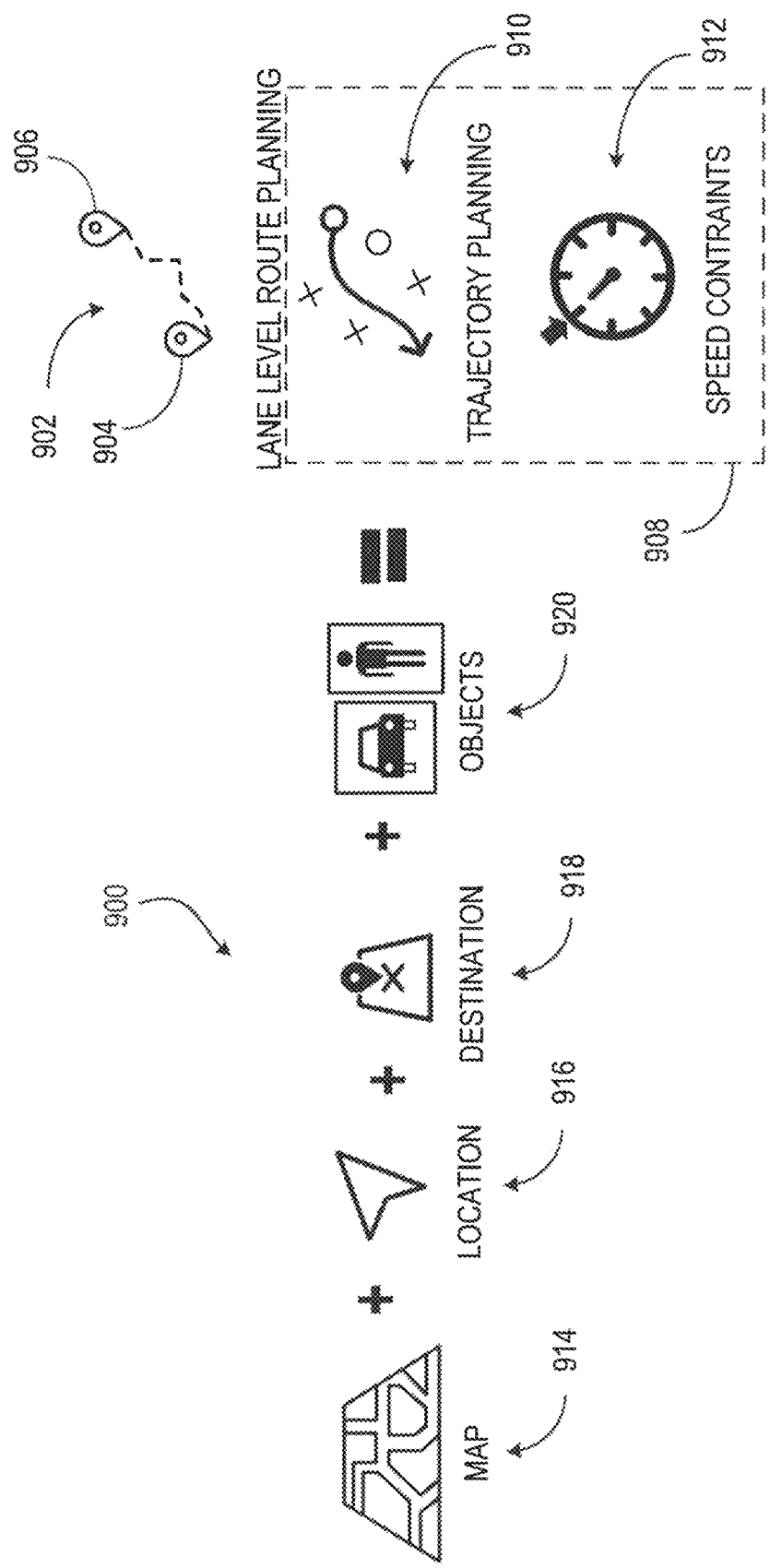
FIG. 9 illustrates a block diagram of the relationships between inputs and outputs of a planning module, in accordance with one or more embodiments.

FIG. 9 illustrates a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
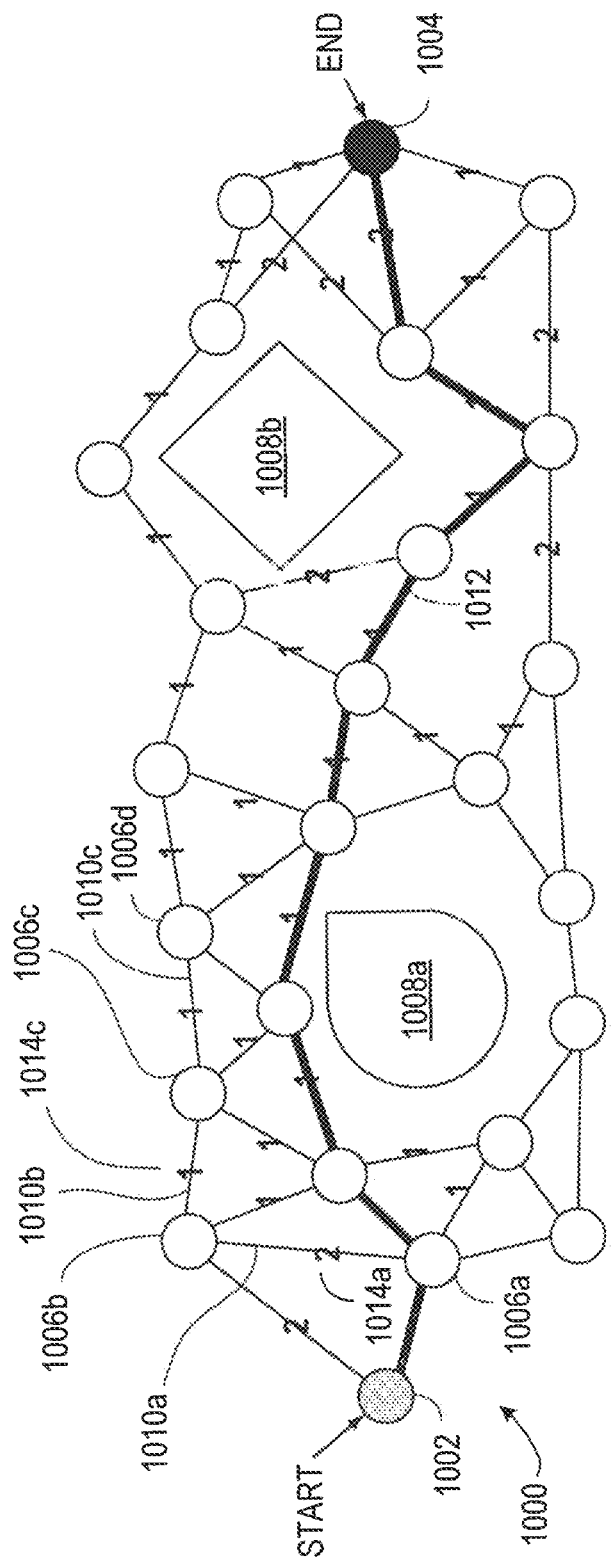
FIG. 10 illustrates a directed graph used in path planning, in accordance with one or more embodiments.

FIG. 10 illustrates a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
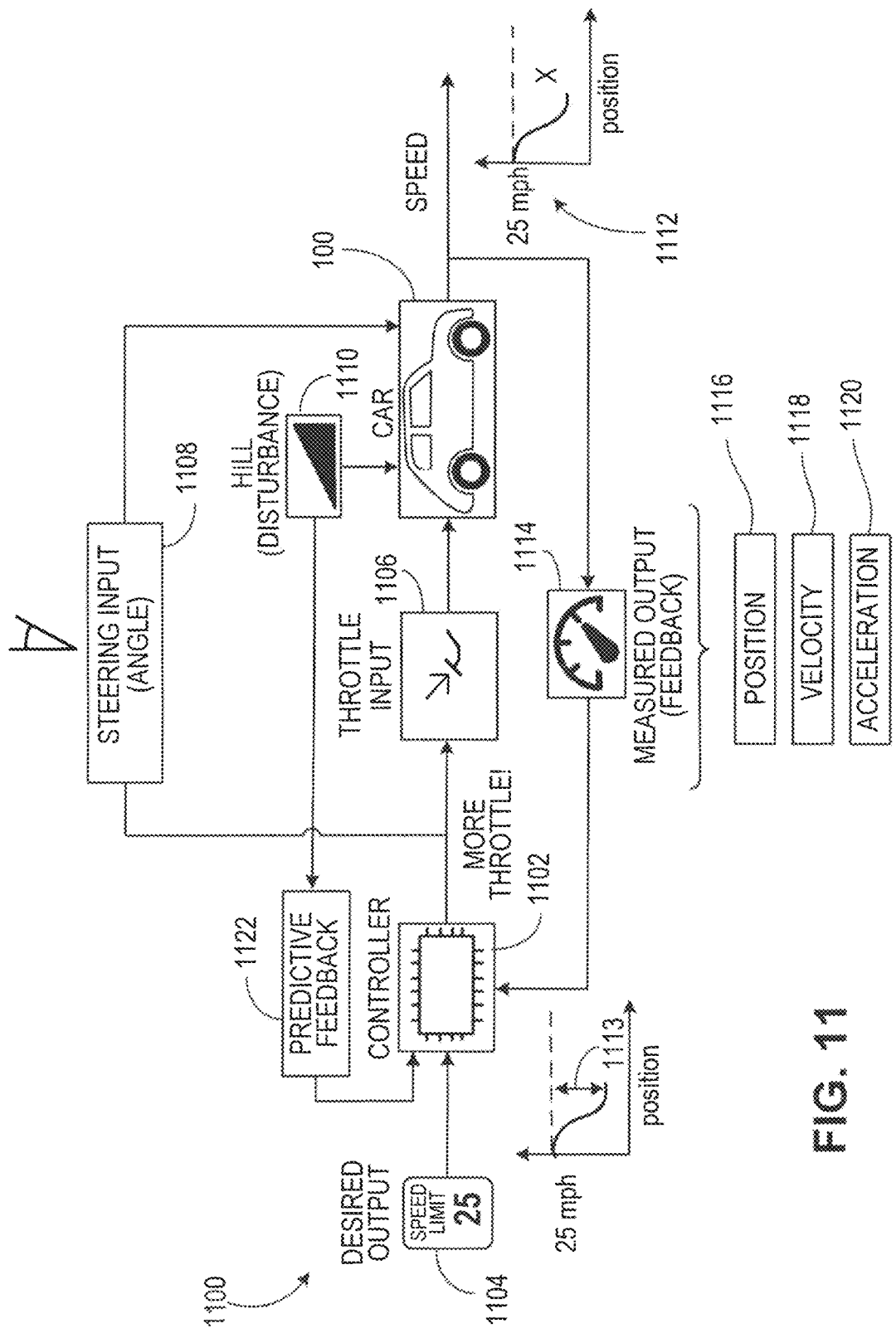
FIG. 11 illustrates a block diagram of the inputs and outputs of a control module, in accordance with one or more embodiments.

FIG. 11 illustrates a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LIDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
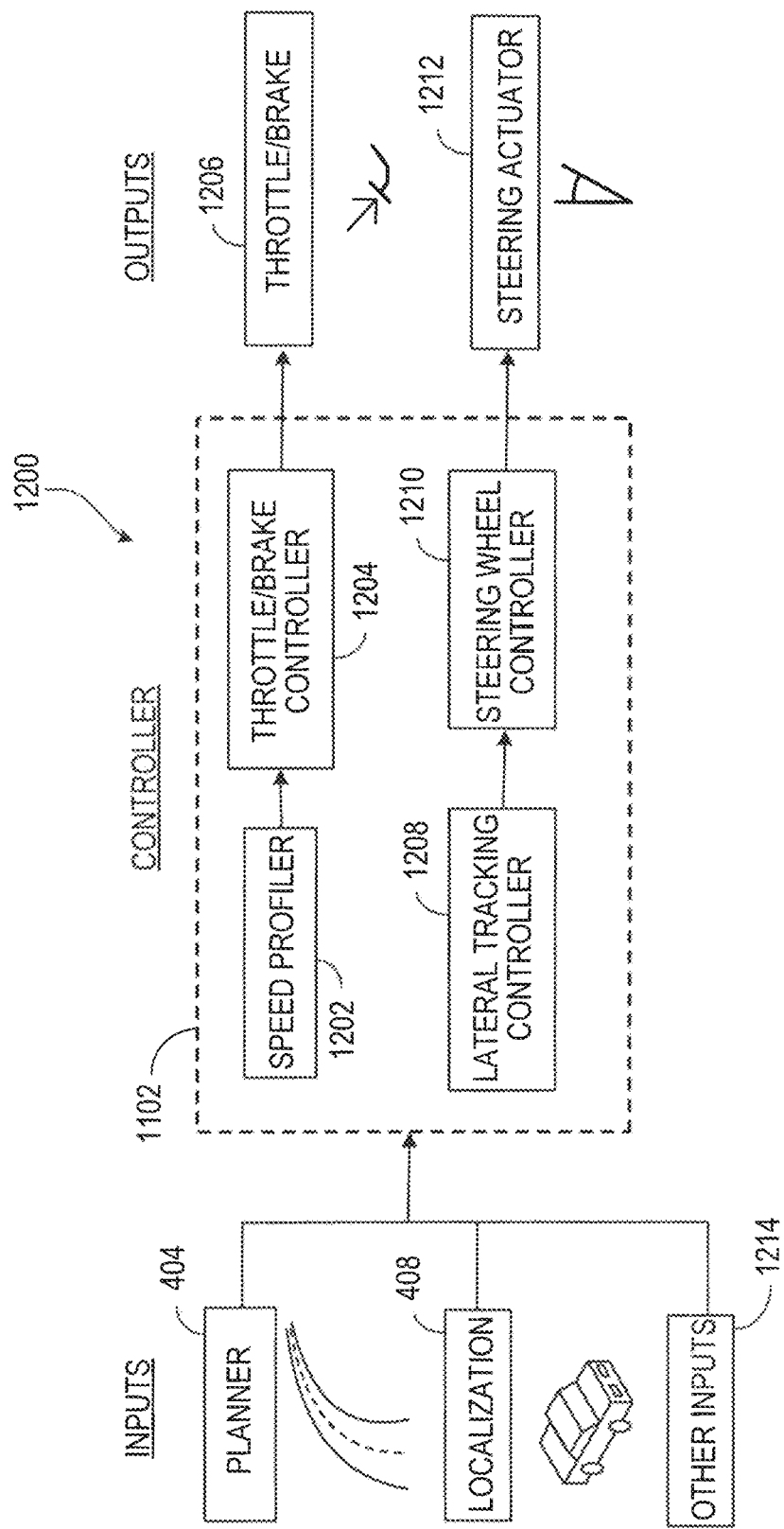
FIG. 12 illustrates a block diagram of the inputs, outputs, and components of a controller, in accordance with one or more embodiments.

FIG. 12 illustrates a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
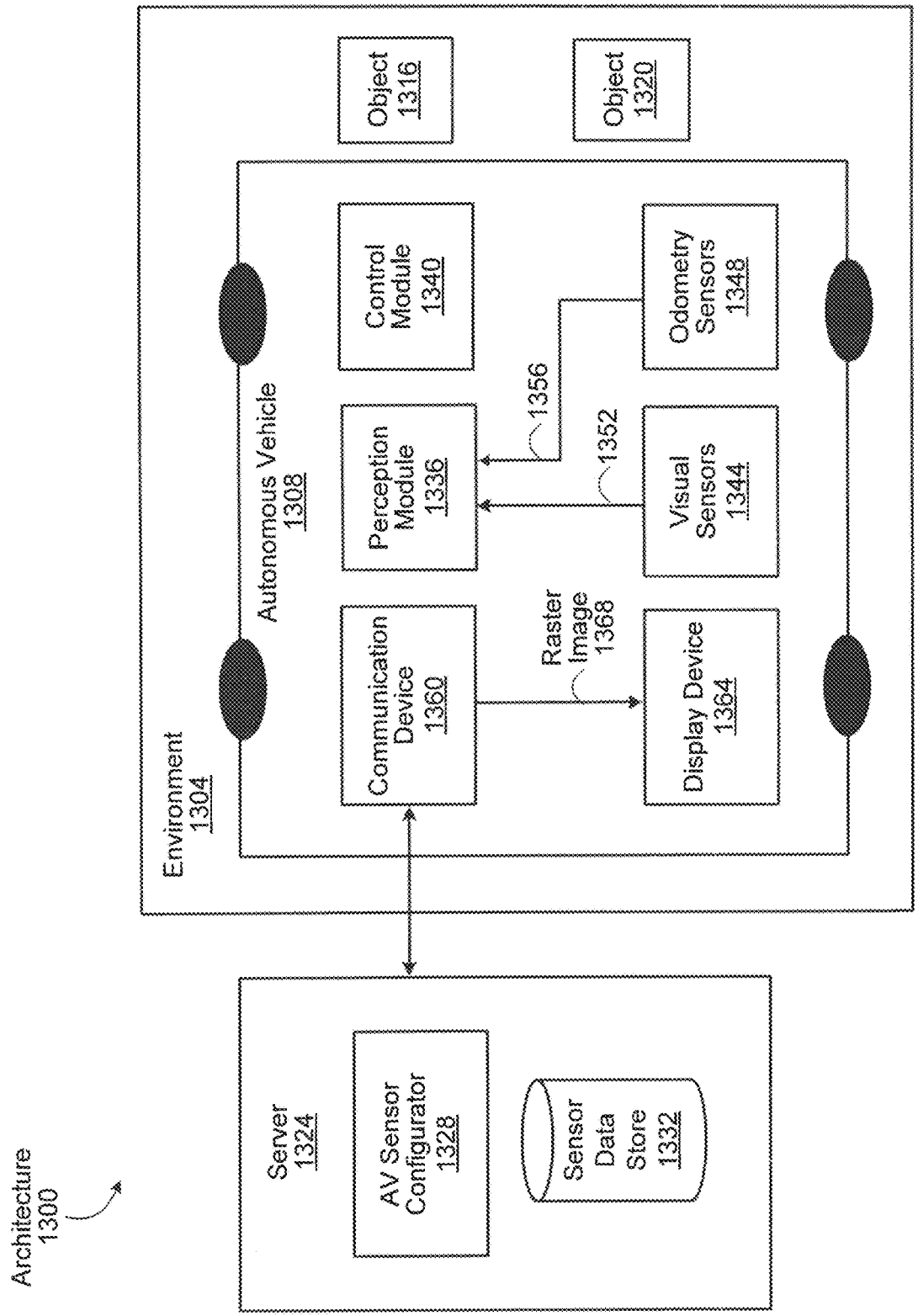
FIG. 13 illustrates a block diagram of an architecture for determination of an optimal spatiotemporal sensor configuration for navigation of an AV using simulation of virtual sensors.

Architecture for Determination of an Optimal Spatiotemporal Sensor Configuration FIG. 13 illustrates a block diagram of an architecture 1300 for determination of an optimal spatiotemporal sensor configuration for navigation of an AV 1308 using simulation of virtual sensors, in accordance with one or more embodiments. The architecture 1300 includes an environment 1304 within which the AV 1308 and objects 1316, 1320 are located. The architecture 1300 also includes a remote server 1324 communicably coupled to the AV 1308. In other embodiments, the architecture 1300 includes additional or fewer components than those described herein. Similarly, the functions can be distributed among the components and/or different entities in a different manner than is described here.

The server 1324 performs computations used by the AV 1308 and other vehicles located within the environment 1304 and also stores data accessed by the AV 1308 and the other vehicles. The server 1324 may be an example of the server 136 shown in FIG. 1. In one embodiment, the server 1308 may be a "cloud" server as described in more detail above with respect to server 136 in FIGS. 1 and 2. Portions of the server 1308 may be implemented in software or hardware. For example, the server 1308 or a portion of the server 1308 may be part of a PC, a tablet PC, an STB, a smartphone, an internet of things (IoT) appliance, or any machine capable of executing instructions that specify actions to be taken by that machine.

In one embodiment, illustrated in FIG. 13, the server 1324 contains an AV sensor configurator 1328. In other embodiments, the AV sensor configurator 1328 is located within the AV 1308 or within a component of the AV 1308, such as the perception module 1336, the control module 1340, or the planning module 404 illustrated and described above with reference to FIG. 4. Portions of the AV sensor configurator 1328 may be implemented in software or hardware. For example, the AV sensor configurator 1328 or a portion of the AV sensor configurator 1328 may be part of a PC, a tablet PC, an STB, a smartphone, an internet of things (IoT) appliance, or any machine capable of executing instructions that specify actions to be taken by that machine.

The AV sensor configurator 1328 builds a model of a virtual AV for simulation in a controlled environment to determine an optimal spatiotemporal sensor configuration for navigation of the AV 1308. The AV sensor configurator 1328 determines the optimal spatiotemporal sensor configuration by simulating virtual models of the visual sensors 1344 and odometry sensors 1348 of the AV 1308. In one embodiment, the AV sensor configurator 1328 generates and segregates a virtual viewing range of a virtual sensor of the virtual AV into several frustums. An example virtual viewing range 1530 of a virtual sensor is illustrated and described below with reference to FIG. 15B. The virtual viewing range of the virtual sensor corresponds to a viewing range of a real sensor, such as a visual sensor 1344 or an odometry sensor 1348, of the AV 1308.

The AV sensor configurator 1328 generates a geometric viewport to simulate the virtual sensor. An example geometric viewport 1500 of a virtual sensor is illustrated and described below with reference to FIG. 15A. A height of the geometric viewport, expressed in pixels, corresponds to a number of rays emitted from the virtual sensor. The AV sensor configurator 1328 segregates the geometric viewport into a number of sections, wherein each section corresponds to one of the frustums. The example geometric viewport 1500 is illustrated segregated into sections below with reference to FIG. 15C. The AV sensor configurator 1328 renders a virtual point cloud of the virtual sensor. The rendering of the virtual point cloud is described in detail below with reference to FIG. 14. The virtual point cloud includes coordinate positions representing a portion of the environment 1304 that is located within the virtual viewing range of the virtual sensor. The AV sensor configurator 1328 determines, based on the virtual point cloud of the virtual sensor, an optimal spatiotemporal configuration of the visual sensors 1344 and odometry sensors 1348 of the AV 1308. The structure and operation of the AV sensor configurator 1328 is described in detail below with reference to FIG. 14.

The sensor data store 1332 stores virtual sensor data generated by the AV sensor configurator 1328 as well as visual sensor data 1352 and odometry data 1356 generated by the visual sensors 1344 and the odometry sensors 1348 of the AV 1308. The sensor data store 1332 is communicatively coupled to the AV sensor configurator 1328. The data stored by the sensor data store 1332 is used by the AV sensor configurator 1328 for computation as well as by modules on the AV 1308, such as the planning module 404 (in FIG. 4) and the control module 1340 for navigation of the AV 1308. The sensor data store 1332 may be organized as a database or table of images stored on one or more of removable or non-removable memory cards, tape cassettes, and computer hard drives.

In one embodiment, the sensor data store 1332 may include multiple data fields, each describing one or more attributes of sensor data. For example, the sensor data store 1332 stores virtual point cloud data of a virtual sensor generated by the AV sensor configurator 1328, sensor data 1352 generated by the visual sensors 1344 representing coordinate positions of the objects 1316, 1320, pixels representing the objects 1316, 1320, raster images representing the coordinate positions of the objects 1316, 1320, pixels of a geometric viewport (illustrated below in FIG. 15), two-dimensional cylindrical representations of a surface of the objects 1316, 1320, reflectance values of a surface of the objects 1316, 1320, LIDAR point cloud data generated by the LIDAR 123 or LIDAR system 602 (illustrated and described above in FIGS. 1 and 6), or odometry data 1356 representing the AV 1308's position, velocity, acceleration, and orientation generated by the odometry sensors 1348.

The environment 1304 may be an example of the environment 190 illustrated and described above with reference to FIG. 1. The environment 1304 represents a geographical area, such as a state, a town, a neighborhood, or a road network or segment. The environment 1304 includes the AV 1308, and one or more objects 1316, 1320. The objects are physical entities external to the AV 1308. In other embodiments, the environment 1304 includes additional or fewer components than those described herein. Similarly, the functions can be distributed among the components and/or different entities in a different manner than is described here.

The objects 1316, 1320 are located within the environment 1304 external to the AV 1308 and are examples of the objects 416 shown in FIGS. 4 and 5. In one embodiment, the object 1316 is a static portion or aspect of the environment 1304, such as a road segment, a traffic signal a building, a parking space located on a road segment, a highway exit or entrance ramp, a plurality of lanes of a drivable area of the environment 1304 orientated in the same direction, an elevation of the drivable area, a curb located adjacent to the drivable area, or a median separating two lanes of the drivable area. Static objects have more permanent characteristics of the environment 1304 that do not change every day. In driving mode, once sensor data representing static characteristics is mapped, the AV 1308 can focus on navigating and mapping other sensor data representing more dynamic characteristics, such as another vehicle. In one embodiment, the object 1320 is a more-dynamic object, such as another vehicle, a pedestrian, or a cyclist. The sensor data representing the dynamic characteristics of the object 1320 instructs the AV 1308 to perform collision prediction and reduce driving aggressiveness if needed. The objects 1316, 1320 are described above in more detail with reference to the physical object 608, boundaries 616 of a physical object 608, the physical object 706, the ground 802, and the object 808 in FIGS. 6, 7, and 8.

In one embodiment, the objects 1316, 1320 are other vehicles such as other AVs, semi-autonomous vehicles, or non-autonomous vehicles navigating or parked outside or within the environment 1304. For example, a vehicle 1316 can enter and exit the environment 1304 during navigation as well as navigate within other environments. The vehicle 1316 may be part of the traffic experienced on roadways of the environment 1304 by the AV 1308. In some embodiments, the vehicles 1316, 1320 belong to one or more AV fleets.

The AV 1308 is a partly-autonomous or fully autonomous vehicle that uses its visual sensors 1344, odometry sensors 1348, and control module 1340 to navigate around objects 1316, 1320 while following a trajectory, for example, the trajectory 198 shown in FIG. 1, within the environment 1304. The AV 1308 includes a communication device 1360, the perception module 1336, the control module 1340, a display device 1364, the visual sensors 1344, and the odometry sensors 1348. The AV 1308 is communicatively coupled to the AV sensor configurator 1328. The AV 1308 may be an example of the AV 100 in FIG. 1. In other embodiments, the AV 1308 includes additional or fewer components than those described herein. Similarly, the functions can be distributed among the components and/or different entities in a different manner than is described here.

The communication device 1360 communicates data such as sensor data 1352 generated by the visual sensors 1344 representing coordinate positions of the objects 1316, 1320, pixels representing the objects 1316, 1320, or raster images representing the coordinate positions of the objects 1316, 1320. In one embodiment, the communication device 1360 communicates data such as reflectance values of a surface of the objects 1316, 1320, LIDAR point cloud data generated by the LIDAR 123 or LIDAR system 602 (illustrated and described above in FIGS. 1 and 6), or odometry data 1356 representing the AV 1308's position, velocity, acceleration, and orientation generated by the odometry sensors 1348. In one embodiment, the communication device 1360 communicates data such as measured or inferred properties of the AV 1308's states and conditions with the server 1324, a passenger within the AV 1308, or other vehicles.

The communication device 1360 may be an example of the communication device 140 shown in FIG. 1. The communication device 1360 is communicatively coupled to the AV sensor configurator 1328 across a network. In an embodiment, the communication device 1360 communicates across the Internet, electromagnetic spectrum (including radio and optical communications) or other media (e.g., air and acoustic media). Portions of the communication device 1360 may be implemented in software or hardware. For example, the communication device 1360 or a portion of the communication device 1360 may be part of a PC, a tablet PC, an STB, a smartphone, an IoT appliance, or any machine capable of executing instructions that specify actions to be taken by that machine. The communication device 1360 is described in more detail above with respect to communication device 140 in FIG. 1.

The perception module 1336 receives the visual sensor data 1352 from the visual sensors 1344 and the odometry data 1356 from the odometry sensors 1348 and performs object recognition and classification functions for the objects 1316, 1320. The perception module 1336 may be an example of the perception module 402 illustrated and described above with reference to FIG. 4. The perception module 1336 is coupled to the AV sensor configurator 1328 to transmit the visual sensor data 1352 and the odometry data 1356 to the AV sensor configurator 1328. Portions of the perception module 1336 may be implemented in software or hardware. For example, the perception module 1336 or a portion of the perception module 1336 may be part of a PC, a tablet PC, an STB, a smartphone, an IoT appliance, or any machine capable of executing instructions that specify actions to be taken by that machine. In one embodiment, the perception module 1336 determines a reflectance of a surface of the object 1316 using the visual sensor data 1352. The reflectance of the surface is the effectiveness of the surface in reflecting light. The reflectance of surfaces of the objects 1316, 1320 is used by the planning module 404, perception module 1336, or control module 1340 to navigate the AV 1308 around the objects 1316, 1320.

The control module 1340 uses inputs from the planning module 404 and the perception module 1336 to operate the brakes 420c, steering 420a, and throttle 420b (illustrated and described above with reference to FIG. 4) to navigate the AV 1308 within the environment 1304. The control module 1340 may be an example of the control module 406 illustrated and described above with reference to FIG. 4. The control module 1340 is coupled to the perception module 1336. Portions of the control module 1340 may be implemented in software or hardware. For example, the control module 1340 or a portion of the control module 1340 may be part of a PC, a tablet PC, an STB, a smartphone, an IoT appliance, or any machine capable of executing instructions that specify actions to be taken by that machine.

To simulate a virtual sensor arranged in a given spatiotemporal configuration, the AV sensor configurator 1328 renders a virtual LIDAR point cloud of the virtual sensor. In one embodiment, the AV sensor configurator 1328 uses a real LIDAR sensor as a model to simulate the virtual sensor. The AV sensor configurator 1328 simulates the virtual sensor using parameters of the real LIDAR sensor, including a number of virtual lasers, a position and angle of each virtual laser, or a rotational speed of each virtual laser. The virtual LIDAR point cloud of the virtual sensor includes a plurality of coordinate positions representing a portion of the environment 1304 that is located within a virtual viewing range of the virtual sensor. The virtual LIDAR point cloud is a dataset of points that represent one or more 3D shapes or features of the portion of the environment 1304 located within the virtual viewing range of the virtual sensor. Each point in the virtual LIDAR point cloud has its own set of X, Y and Z coordinates and other attributes described below.

The AV sensor configurator 1328 renders, using the virtual LIDAR point cloud of the virtual sensor, a raster image representing coordinate positions of an object, for example, object 1316. To render the raster image, the AV sensor configurator 1328 uses attributes of the dataset of points. The attributes represent time, flight line, intensity (the amount of light returning back from a coordinate position), or color of the object 1316, etc. In one embodiment, the AV sensor configurator 1328 determines, using the coordinate positions of the object 1316 in the raster image, a distance from the AV 1308 to the object 1316. In other embodiments, the perception module 1336 or the planning module 404 determines, using the coordinate positions of the object 1316 in the raster image, a distance from the AV 1308 to the object 1316. For example, the distance from the AV 1308 to the object 1316 may be determined as follows. If the coordinate position of the AV 1308 in the environment 1304 is (p1, q1) and the coordinate position of the object 1316 is (p2, q2), the distance is determined by a square root of $(p2-p1)^2+(q2-q1)^2$.

In one embodiment, the perception module 1336 determines the distance from the AV 1308 to the object 1316 based on a distance of each cell in the raster image from a set of environmental features. The perception module 1336 may also determine a shortest path across a surface between the AV 1308 to the object 1316. In another embodiment, the perception module 1336 measures the distance in terms of a cost, for example, energy expenditure of traveling to the object 1316.

The control module 1340 of the AV 1308 navigates the AV 1308 to avoid collisions with the object 1316 based on the determined distance. In one embodiment, the control module 1340 navigates a discretized drivable area while performing collision checking or randomized planning, such as probabilistically exploring the drivable area around the object 1316. In another embodiment, the control module 1340 follows a collision-free trajectory determined by the planning module 404 to avoid the object 1316. In another embodiment, if the object 1316 is a moving object such as another vehicle, the control module 1340 infers the object 1316's intention from its motion, such as giving way or acting aggressively. The control module 1340 triggers the steering control 102, brakes 103, gears, accelerator pedal or other acceleration control mechanisms if a predicted time to collision with the object 1316 falls below a threshold.

In one embodiment, the AV sensor configurator 1328 or the perception module 1336 determines, using the coordinate positions of the object 1316 in the raster image, a reflectance of a surface of the object 1316. The reflectance of a surface of the object 1316 is the effectiveness of the surface in reflecting light. The reflectance is determined by the AV sensor configurator 1328 or the perception module 1336 as a fraction of incident light that is reflected by the surface. In one embodiment, the AV sensor configurator 1328 or the perception module 1336 determines a reflectance spectrum or spectral reflectance curve, which is a plot of the reflectance as a function of wavelength. In embodiments, the AV sensor configurator 1328 or the perception module 1336 may determine the hemispherical reflectance or directional reflectance of the surface of the object 1316 for use in navigation by the control module 1340.

The control module 1340 navigates the AV 1308 to avoid a collision of the AV 1308 with the object 1316 based on the determined reflectance. In one embodiment, the environment 1304 is modeled as a probabilistic grid in which each grid cell is represented by a Gaussian distribution over reflectance values. The control module 1340 or planning module 404 uses Bayesian inference to preferentially weight grid cells most likely to be stationary within the environment 1304 to avoid collisions while driving the AV 1308. In another embodiment, the control module 1340 or planning module 404 uses a reflectance-based inference grid based on the variations in reflectance introduced by laser source, angle of incidence, range, etc. The control module 1340 navigates the AV 1308 based on the appearance of the surface of the object 1316 from the reflectance-based inference grid. For example, a wet surface tends to reflect less infrared laser light than do dry surfaces.

The display device 1364 provides data to a passenger riding in the AV 1308. The data may represent the trajectory 198 of the AV 1308, passenger comfort settings, or operational metrics such as speed or acceleration, etc. The display device 1364 may be an example of the display 312 illustrated and described above with reference to FIG. 3. The display device 1364 is coupled to the communication device 1360 and one or more other modules of the AV 1308 to receive the data to be displayed to the passenger. In one embodiment, the communication device 1360 transmits a raster image 1368 generated by the AV sensor configurator 1328 to the display device 1364 for display. The raster image represents coordinate positions of an object such as 1316 located within the environment 1304, as described below with reference to FIG. 14. The display device 1364 displays individual pixels as squares and constructs colors by adding the values for red, green and blue. In one embodiment, the raster image includes a dot matrix data structure that represents a generally rectangular grid of pixels (points of color), viewable via the display device 1364. The raster images are stored in image files in the sensor data store 1332.

The one or more visual sensors 1344 sense a state of the environment 1304, such as the presence and structure of the objects 1316, 1320, and transmit the sensor data 1352 and semantic data representing the state to the perception module 1336. The visual sensors 1344 may be an example of the sensors 122-123 illustrated and described above with reference to FIG. 1. The visual sensors 1344 are communicatively coupled to the perception module 1336 to transmit the sensor data 1352 and semantic data. The visual sensors 1344 include one or more monocular or stereo video cameras in the visible light, infrared or thermal (or both) spectra, LIDAR, RADAR, ultrasonic sensors, time-of-flight (TOF) depth sensors, and may include temperature sensors, humidity sensors, or precipitation sensors.

The visual sensors 1344 are arranged in a spatiotemporal configuration on the AV 1308. In one embodiment, the visual sensors 1344 include LIDARs. The AV 1308 may be equipped with a single 360 degree LIDAR installed on the roof of the AV 1308. In another embodiment, the AV 1308 includes a number of LIDARs. One or more LIDARs may be arranged on each side of the roof. The spatiotemporal configuration includes the pitch, roll, and heading of the LIDARs. The pitch of a LIDAR refers to the angular motion or angular orientation of the LIDAR about a transverse axis. The roll of a LIDAR refers to the rotational displacement or orientation of the LIDAR about a longitudinal axis. The heading of a LIDAR refers to the directional orientation of the LIDAR. An optimal spatiotemporal configuration is based on optimizing the information generated about the environment 1304 by the one or more LIDARs and the cost incurred in generating the information. In one embodiment, the visual sensors 1344 include 3D cameras. A 3D camera of the AV 1308 is used to acquire a larger field of view of the environment 1304 through a camera configuration. In this configuration, the environment 1304 is segmented into cubes and an optimal 3D camera configuration is determined by a number of cubes in the observation range of the cameras.

In one embodiment, the sensor data 1352 includes LIDAR point cloud data. For example, the LIDAR sensors 1344 of the AV 1308 are used to illuminate a target object 1316 with pulsed laser light and measure the reflected pulses. Differences in laser return times and wavelengths can then be used to generate the sensor data 1352 and create a digital 3-D representation (feature) of the target object 1316. In one embodiment, the LIDAR point cloud data is stored as a multidimensional occupancy grid. The LIDAR point cloud data is pre-processed at the signal level and then processed at a higher level to extract features of the objects 1316, 1320. In some embodiments, a combination two- and three-dimensional grid structure is used and the space in these structures is tessellated into several discrete cells. The structure of the LIDAR point cloud data allows a large amount of raw measurement data to be handled by the perception module 1336.

The sensor data 1352 represents coordinate positions of the object 1316. In one embodiment, the measurement points in the sensor data 1352 are stored as a three-dimensional grid. Each grid cell of the three-dimensional grid has an associated probability. The probability refers to a likelihood that the grid cell is occupied by a portion of an object, for example, object 1316. The grid cells that are occupied by a portion of the object 1316 have a probability greater than 0.5. The cells that are not occupied possess a probability less than 0.5 (white space). The grid coordinate system uses the spatiotemporal configuration of the visual sensors 1344 and the vehicle position (for example, determined using egomotion estimation) to represent the coordinate positions of the object 1316. The perception module 1336 determines the spatial characteristics of the object 1316 using the sensor data 1352.

In one embodiment, the visual sensors 1344 include spatially distributed smart camera or LIDAR devices capable of processing and fusing the sensor data 1352 of the environment 1304 from a variety of viewpoints into a more useful form of data than individual images. For example, the sensor data 1352 includes LIDAR point cloud data reflected from a target object 1316. In another example, the sensor data 1352 includes an image of the environment 1304. The sensor data 1352 is transmitted to the perception module 1336 for image processing, communication, and storage functions. The visual sensors 1344 are described above in more detail with reference to inputs 502*a-d*, LIDAR system 602, light 604*a-c*, light emitter 606, light detectors 610, field of view 614, and light 804*a-d* in FIGS. 6, 7, and 8. The sensor data 1352 is described above in more detail with reference to outputs 504*a-d*, image 612, and LIDAR data points 704 in FIGS. 6, 7, and 8.

The one or more odometry sensors 1348 sense a state of the AV 1308 with respect to the environment 1304 and transmit odometry data 1356 representing the state of the AV 1308 to the perception module 1336. The odometry sensors 1348 may be an example of the sensors 121 illustrated and described above with reference to FIG. 1. The odometry sensors 1348 are communicatively coupled to the perception module 1336 to transmit the odometry data 1356. The odometry sensors 1348 include one or more GNSS sensors, IMUs that measure both vehicle linear accelerations and angular rates, wheel speed sensors for measuring or estimating wheel slip ratios, wheel brake pressure or braking torque sensors, engine torque or wheel torque sensors, or steering angle and angular rate sensors. An IMU is an electronic device that measures and reports the AV's specific force, angular rate, or the magnetic field surrounding the AV. The IMU uses a combination of accelerometers, gyroscopes, or magnetometers. The IMU is used to maneuver the AV. The IMU allows a GNSS receiver on the AV to work when GNSS-signals are unavailable, such as in tunnels, or when electronic interference is present. The odometry measurements include a speed, an acceleration, or a steering angle. The AV uses the odometry data to provide a uniquely identifying signature for distinguishing between different spatiotemporal locations within the environment.

In one embodiment, the odometry sensors 1348 measure and report the AV 1308's spatiotemporal location, specific force, angular rate, or a magnetic field surrounding the AV 1308, using a combination of accelerometers, gyroscopes, or magnetometers. In another embodiment, the odometry sensors 1348 generate odometry data 1356 including a speed, a steering angle, a longitudinal acceleration, or a lateral acceleration. The odometry sensors 1348 utilize the raw IMU measurements to determine attitude, angular rates, linear velocity, and position relative to a global reference frame. In one embodiment, the odometry data 1356 reported by the IMU is used to determine attitude, velocity, and position by integrating angular rate from a gyroscope to calculate angular position. The perception module 1336 or the AV sensor configurator 1328 integrates and correlates the odometry data 1356 with the sensor data 1352 to derive the coordinates of the AV 1308 and the objects 1316, 1320. The AV sensor configurator 1328 uses the odometry data 1356 to determine an optimal spatiotemporal configuration for the visual sensors 1344 based on the variation in odometry measurements with variation in spatiotemporal configuration for the visual sensors 1344. The control module 1340 uses the odometry data 1356 to navigate the AV 1308 to avoid collisions with the objects 1316, 1320.

Among the benefits and advantages of the embodiments disclosed herein are that many different and complex self-driving scenarios can be simulated in a safe and cost-effective manner. The disclosed embodiments obviate driving millions of miles in a physical AV to analyze and verify different sensor configurations. In embodiments, sensors such as LIDARs, RADARs, and cameras can be simulated in dangerous and costly scenarios such as collisions of vehicles, which would be expensive using traditional methods on physical roads. Moreover, certain traditional sensors that rely on lasers, such as LIDARs are sometimes suboptimal when encountering reflective surfaces such as puddles of water or glass-fronted buildings. The disclosed embodiments can analyze and verify such scenarios and determine sensor accuracy. Furthermore, the disclosed embodiments can also be used to test the range and effectiveness of different sensors. AVs operating in different environmental conditions may require certain sensors. For example, dense urban environments may require spinning LIDARs whereas a highway or freeway environment may require solid state LIDARs. Other embodiments disclose performing blind spot analysis for various sensors to determine optimal sensor configuration involving the number, type, and spatial arrangement of the sensors.

Further benefits and advantages are that the virtual sensor simulations increase the usefulness of physically driving the AV 1308 through the environment by comparing the virtual point cloud of the simulation scenarios with the sensor data 1352. The disclosed embodiments enable realistic sensor simulation at reduced cost and increased accuracy. Rendering the lines in the raster images does not affect the simulation performance and is useful in verifying the virtual point cloud data. For example, the raster images can be used to determine whether the virtual lasers and virtual point cloud are matched visually.

Solid-state LIDARs can have blind spots because the LIDARs emit rays in only a single direction. Moreover, the LIDARs are typically unable to sense heat. Therefore, traditional LIDARs can sometimes miss children or pets on a roadway. The embodiments disclosed herein provide an improved spatiotemporal configuration of LIDAR sensors that reduces blind spots and improves the detection of children and pets. Navigation of an AV using the optimal spatiotemporal configuration for the visual sensors 1344 obtained from the simulation of virtual sensors disclosed herein is more accurate and computationally less expensive than traditional methods. The AV is also able to efficiently determine localization for real-time navigation. Navigating the AV using the optimal spatiotemporal configuration for the visual sensors 1344 results in increased passenger and pedestrian safety, lower wear and tear on the AV, reduced travel time, a reduced travel distance, etc. Increased safety for other vehicles on the road network is also achieved.

Block Diagram of an AV Sensor Configurator

Figure 14:
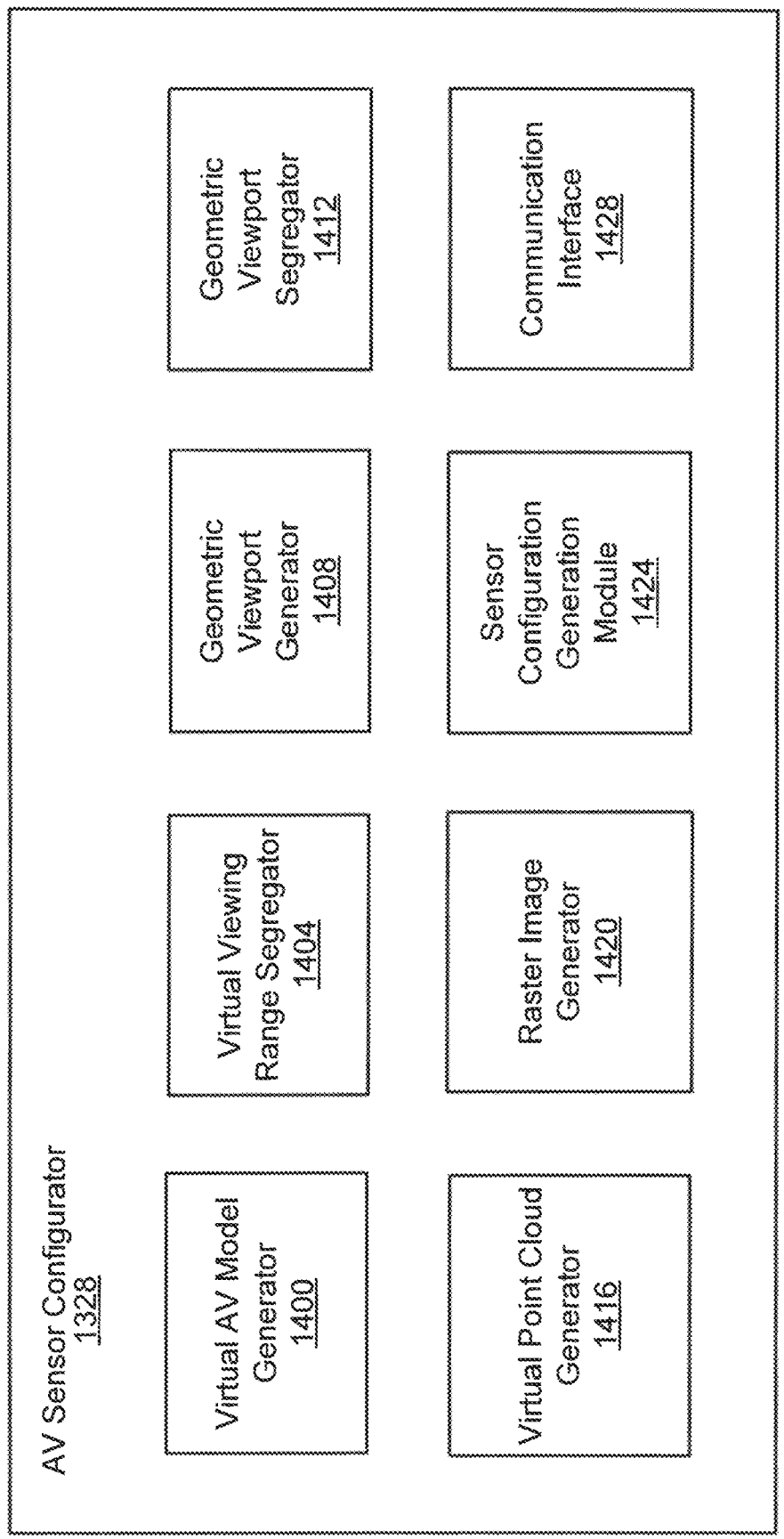
FIG. 14 illustrates a block diagram of an AV sensor configurator for determination of an optimal spatiotemporal sensor configuration for navigation of the AV using simulation of virtual sensors.

FIG. 14 illustrates a block diagram of an AV sensor configurator 1328 for determination of an optimal spatiotemporal sensor configuration for navigation of the AV 1308 using simulation of virtual sensors, in accordance with one or more embodiments. The AV sensor configurator 1328 builds a model of a virtual AV for simulation in a controlled environment to determine the optimal spatiotemporal sensor configuration by simulating virtual models of the visual sensors 1344 and odometry sensors 1348 of the AV 1308. The AV sensor configurator 1328 includes a virtual AV model generator 1400, a virtual viewing range segregator 1404, a geometric viewport generator 1408, a geometric viewport segregator 1412, a virtual point cloud generator 1416, a raster image generator 1420, a sensor configuration generation module 1424, and a communication interface 1428. In other embodiments, the AV sensor configurator 1328 includes additional or fewer components than those described herein. Similarly, the functions can be distributed among the components and/or different entities in a different manner than is described here. The AV sensor configurator 1328 may be located on the server 1324, as illustrated above in FIG. 13, or on the AV 1308. In an embodiment, the AV sensor configurator 1328 is part of the planning module 404.

The virtual AV model generator 1400 generates a model of a virtual vehicle based on the AV 1308 to perform the sensor simulation. The virtual AV model generator 1400 is communicatively coupled to the virtual viewing range segregator 1404, the virtual point cloud generator 1416, and the sensor configurator generation module 1424 to generate the optimal spatiotemporal configuration of the visual sensors 1344. Portions of the virtual AV model generator 1400 may be implemented in software or hardware. For example, the virtual AV model generator 1400 or a portion of the virtual AV model generator 1400 may be part of a PC, a tablet PC, an STB, a smartphone, an internet of things (IoT) appliance, or any machine capable of executing instructions that specify actions to be taken by that machine.

The virtual AV model generator 1400 generates a model of a virtual AV operating in the environment 1304. In one embodiment, the model of the virtual AV includes a predictive model as well as a functional model of the AV 1308's components and sensors. The model is designed to be flexible to define different driving scenarios for the AV 1308. In one embodiment, the virtual AV model generator 1400 uses photorealistic simulation to model the AV 1308's visual sensors 1344, including cameras, LIDAR, and RADAR. The model of the virtual AV is used to simulate driving conditions, such as rainstorms, snowstorms, and glare on road surfaces.

The model of the virtual AV includes a virtual sensor, for example a virtual radar, virtual LIDAR, or virtual camera having a virtual viewing range. In one embodiment, the virtual sensor includes a number of virtual lasers separated into a number of groups. Each group of virtual lasers is angled and spaced from each other group as well as from the virtual viewing range. The individual virtual lasers are angled based on the virtual viewing range and the number of virtual lasers. Thus, different sensors and different sets of virtual lasers and angles are modeled. To simulate the virtual sensor, the virtual lasers are rotated in horizontal angular steps within a specific time frame and a hit position of each virtual laser is recorded. The virtual sensor within the model of the virtual AV is configured using parameters, such as a number of the virtual lasers, a virtual laser range, a rotation speed of the virtual sensor, a rotation angle between scans, a vertical offset between groups of virtual lasers, or a vertical viewing range.

The virtual viewing range segregator 1404 segregates a virtual viewing range of a virtual sensor of the model of the virtual AV. The virtual viewing range segregator 1404 is communicatively coupled to the virtual AV model generator 1400 to receive the model. Portions of the virtual viewing range segregator 1404 may be implemented in software or hardware. For example, the virtual viewing range segregator 1404 or a portion of the virtual viewing range segregator 1404 may be part of a PC, a tablet PC, an STB, a smartphone, an internet of things (IoT) appliance, or any machine capable of executing instructions that specify actions to be taken by that machine.

The virtual viewing range of the virtual sensor corresponds to a viewing range of a visual sensor 1344 of the AV 1308 operating in the environment 1304. The virtual sensor sweeps or scans in a direction of the beam or rays, thus generating a collection of distance measurements within the virtual viewing range. The virtual viewing range is a range of horizontal and vertical angles through which the virtual sensor captures virtual sensor data. For example, a two-axis scanning virtual LIDAR captures shape information in the horizontal and vertical directions from a stationary location. In one embodiment, the virtual viewing range of the virtual sensor ranges from a single window to full spherical coverage of 360 by 180 degrees. In another embodiment, the virtual viewing range of the virtual sensor is 360 degrees in the horizontal and 30 to 120 degrees in the vertical.

The virtual viewing range segregator 1404 segregates the virtual viewing range of the virtual sensor into a plurality of frustums. Each frustum is a portion of a solid shape, such as a cone or a pyramid that lies between one or two parallel planes cutting the solid shape. For example, a right frustum is a parallel truncation of a right pyramid or a right cone. When all the edges of the frustum are identical, the frustum becomes a uniform prism. An example virtual viewing range 1530 of a virtual sensor segregated into frustums, for example the frustums 1534, 1538, is illustrated below with reference to FIG. 15B. Each plane section of a frustum is a base of the frustum. The axis of a frustum is the same as the axis of the original cone or pyramid. A frustum may be circular if it has circular bases. The height of a frustum is the perpendicular distance between the planes of the two bases.

The geometric viewport generator 1408 generates a geometric viewport to simulate the virtual sensor. An example of a geometric viewport 1500 is illustrated below in FIG. 15A. The geometric viewport generator 1408 is communicatively coupled to the virtual AV model generator 1400 and geometric viewport segregator 1412 to generate and transmit a geometric viewport. Portions of the geometric viewport generator 1408 may be implemented in software or hardware. For example, the geometric viewport generator 1408 or a portion of the geometric viewport generator 1408 may be part of a PC, a tablet PC, an STB, a smartphone, an internet of things (IoT) appliance, or any machine capable of executing instructions that specify actions to be taken by that machine.

The geometric viewport generator 1408 generates a geometric viewport including a plurality of pixels. The geometric viewport is a viewing region having a polygonal shape used for rendering a representation of the objects 1316, 1320 as an image. In one embodiment, the geometric viewport includes an area of interest for the virtual sensor expressed in coordinates such as meters or GNSS coordinates. In one embodiment, the geometric viewport includes an area that is expressed in rendering-device-specific coordinates. For example, a plurality of pixels is used to express the screen coordinates in which the objects 1316, 1320 are rendered. In one embodiment, the geometric viewport includes a 2D rectangle that is used to render a 3D environment as viewed by a spatiotemporal configuration of the virtual sensor.

In one embodiment, the geometric viewport has a rectangular shape, as illustrated with reference to the rectangular viewport 1500 below in FIG. 15A. The geometric viewport has a height corresponding to a number of rays emitted from the virtual sensor. As illustrated and described above with reference to FIG. 6, a visual sensor such as the LIDAR system 602 emits light lays 604*a-c* from a light emitter 606, for example, a laser transmitter). The height of the geometric viewport thus corresponds to the number of rays emitted by the virtual sensor that is modeling a visual sensor 1344 of the AV 1308. An example of a height 1504 of the rectangular viewport 1500 is illustrated below in FIG. 15A. In one embodiment, the geometric viewport has a width that increases as a number of the frustums increases. The width corresponds to the density of the virtual sensor simulation or the density of the LIDAR returns. An example of a width 1508 of the rectangular viewport 1500 is illustrated below in FIG. 15A. The number of rays emitted by the virtual sensor and the density of sensor returns correspond to the resolution of the LIDAR and allow the LIDAR to provide a three-dimensional view of the environment 1304 by scanning laser rays back and forth across the virtual viewing range.

The geometric viewport segregator 1412 divides the generated geometric viewport into sections to simulate the virtual sensor. An example of a segregated geometric viewport 1500 is illustrated below in FIG. 15C. The geometric viewport segregator 1412 is communicatively coupled to the geometric viewport generator 1408 to receive the geometric viewport. Portions of the geometric viewport segregator 1412 may be implemented in software or hardware. For example, the geometric viewport segregator 1412 or a portion of the geometric viewport segregator 1412 may be part of a PC, a tablet PC, an STB, a smartphone, an internet of things (IoT) appliance, or any machine capable of executing instructions that specify actions to be taken by that machine.

The geometric viewport segregator 1412 segregates the geometric viewport into a plurality of sections. Each section of the geometric viewport is a virtual area used by the raster image generator 1420 to scale and size a raster image when rendering the raster image to the geometric viewport. An example of sections 1560 and 1564 of the geometric viewport 1500 is illustrated below in FIG. 15C. Each section of the plurality of sections that the geometric viewport is segregated into corresponds to a frustum of the virtual viewing range. In one embodiment, each section of the geometric viewport corresponds to a region of the environment 1304 that is rendered on the geometric viewport. The geometric viewport segregator 1412 obtains a section by truncating, using parallel planes, a pyramid of vision of the virtual sensor. The section is thus an adaptation of a cone of vision that a visual sensor 1344 of the AV 1308 has to the geometric viewport.

In one embodiment, the segregating of the geometric viewport into the plurality of sections includes mapping a near plane of each frustum onto a corresponding section of the plurality of sections. The planes that intersect a frustum perpendicular to the viewing direction of the virtual sensor are called the near plane and the far plane. For example, a section may correspond to a frustum of a rectangular pyramid. An example of a near plane 1542 of a frustum 1534 is illustrated below with reference to FIG. 15B.

The virtual point cloud generator 1416 renders a virtual point cloud of the virtual sensor. The virtual point cloud generator 1416 is communicatively coupled to the virtual AV model generator 1400 and the raster image generator 1420 to generate images representing the virtual point cloud data. Portions of the virtual point cloud generator 1416 may be implemented in software or hardware. For example, the virtual point cloud generator 1416 or a portion of the virtual point cloud generator 1416 may be part of a PC, a tablet PC, an STB, a smartphone, an internet of things (IoT) appliance, or any machine capable of executing instructions that specify actions to be taken by that machine.

The virtual point cloud generator 1416 renders a virtual point cloud of the virtual sensor. In an embodiment, the virtual point cloud is generated or modeled by projecting simple geometric shapes such as triangles that intersect the virtual laser beams generated by the virtual sensor. The virtual point cloud is then subsequently generated based on virtual sensor location and the relative position of the geometric shapes with respect to the virtual sensor. The virtual point cloud generator 1416 relies on the physical properties of the sensor to be simulated. For example, for simulating spinning LIDARs, the virtual point cloud generator 1416 accounts for the rotational movement of the spinning LIDAR motor and the movement of the entire LIDAR package, including the sensor housing, mounted on a moving vehicle). In an embodiment, the virtual point cloud generator 1416 simulates a virtual sensor by iteratively progressing the dynamic state of the simulated environment 1304 according to a fixed timestamp and then capturing the resulting viewing range of each laser at the iterated timestamp.

In one embodiment, the virtual point cloud generator 1416 uses parameters of the virtual sensor to tune the virtual sensor model and render the virtual point cloud. For example, the virtual point cloud generator 1416 may vary the scan angle, pulse rate frequency, sidelap, or mean point density of the virtual sensor to render the virtual point cloud. In one embodiment, the virtual point cloud generator 1416 uses a data-driven model of the virtual sensor, which is tuned based on real LIDAR data obtained from the visual sensors

1344. The virtual point cloud generator 1416 uses a dataset, which is a set of pose-observation pairs of a LIDAR. Each virtual LIDAR pose-observation pair is converted by the virtual point cloud generator 1416 into the virtual point cloud. The pose of the LIDAR refers to the degrees of rotation and translation of the LIDAR's orientation. The pose-observation pair data is therefore used to reconstruct a 3D scene sensed by the LIDAR.

The virtual point cloud includes a plurality of coordinate positions representing a portion of the environment 1304 that is located within the virtual viewing range of the virtual sensor. The data points within the virtual point cloud include measurement coordinates of external surfaces of the objects 1316, 1320 located within the virtual viewing range of the virtual sensor. In one embodiment, the virtual point cloud is converted to the plurality of coordinate positions using surface reconstruction. In other embodiments, the plurality of coordinate positions of the virtual point cloud is used to render a digital elevation model or a volumetric model of the portion of the environment 1304 that is located within the virtual viewing range of the virtual sensor.

In one embodiment, the virtual point cloud generator 1416 renders a plurality of virtual point clouds of a plurality of virtual sensors of the virtual vehicle. Feature curves of the objects 1316, 1320 may be extracted from the plurality of virtual point clouds. The virtual point cloud generator 1416 extracts feature curves from the intersections of the plurality of virtual point clouds that represent regions of the environment 1304. For example, the virtual point cloud generator 1416 uses linear approximation of the plurality of virtual point clouds through a variational-shape approximation approach. Variational-shape approximation is a process of repeatedly partitioning the plurality of virtual point clouds into a set of geometric shapes, for example, ellipses, that provide a concise representation of a surface of an object of the environment 1304.

In one embodiment, the virtual point cloud generator 1416 aggregates the plurality of virtual point clouds into an aggregate virtual point cloud. The aggregate virtual point cloud represents a portion of the environment 1304 located within a virtual viewing range of the plurality of virtual sensors. For example, the virtual point cloud generator 1416 computes an axis-aligned bounding box for an overlapped region between the plurality of virtual point clouds. The virtual point cloud generator 1416 divides the bounding box into grid boxes and merges points within each grid box by averaging their locations and colors.

The raster image generator 1420 generates a raster image based on the virtual point cloud data. The raster image generator 1420 is communicatively coupled to the virtual point cloud generator 1416 to receive the virtual point cloud data. Portions of the raster image generator 1420 may be implemented in software or hardware. For example, the raster image generator 1420 or a portion of the raster image generator 1420 may be part of a PC, a tablet PC, an STB, a smartphone, an internet of things (IoT) appliance, or any machine capable of executing instructions that specify actions to be taken by that machine.

In one embodiment, the raster image generator 1420 generates a plurality of raster images from the virtual point cloud data. The raster images provide a visual representation of how the virtual sensor is operating by rendering lines along the virtual lasers without having to display the virtual point cloud. Among the benefits and advantages of the disclosed approach are that rendering the lines does not affect the simulation performance and is useful in verifying the virtual point cloud data. For example, the raster images can be used to determine whether the virtual lasers and the virtual point cloud are matched visually.

Each raster image includes the plurality of pixels of the geometric viewport and represents coordinate positions of an object located within the environment. In one embodiment, a raster image includes a dot matrix data structure that represents a rectangular grid of pixels viewable via the geometric viewport. Each raster image rendered on the geometric viewport corresponds to a bitmap. The bitmap may be stored in the same format used for storage in the sensor data store 1332 or as a device-independent bitmap. Each raster image may be characterized by a width and a height of the raster image in pixels and by a number of bits per pixel or color depth. In one embodiment, a plurality of virtual sensors of the model of the virtual AV is arranged in a spatiotemporal configuration of a plurality of potential spatiotemporal configurations. For each such spatiotemporal configuration of the plurality of spatiotemporal configurations, the raster image generator 1420 renders a raster image representing the plurality of coordinate positions of the environment 1304 within the virtual viewing range of the plurality of virtual sensors.

In one embodiment, the rendering of the raster image includes receiving, using the visual sensors 1344 of the AV 1308, the sensor data 1352. The sensor data 1352 represents coordinate positions of an object located within the environment 1304, for example, object 1316. The process of receiving the sensor data 1352 representing coordinate positions of the object is illustrated and described in detail above with reference to the LIDAR system 602 in FIG. 6. The perception module 1336 or the AV sensor configurator 1328 may transmit the sensor data 1352 to the sensor data store 1332 via the communication device 1360 and the communication interface 1428. The raster image generator 1420 generates pixels representing the object 1316. The generated pixels are combined with the sensor data 1352 to generate the raster image. In this manner spectral information may be combined with the pixels to increase object classification accuracy.

In one embodiment, the rendering of the raster image is based on a geometric position and a directional orientation of a visual sensor 1344 relative to the coordinate positions of an object, for example object 1316. The rendering of the raster image is based on a position and a six degrees of freedom directional orientation of each visual sensor 1344. For example, the six degrees of freedom directional orientation of a visual sensor may be determined by utilizing known reference geometries. In one embodiment, the rendering of the raster image is performed by varying parameters of the visual sensor 1344, such as a horizontal angle, a horizontal resolution, a vertical angle, a vertical resolution, a range, a shape of a beam spot (circular, rectangular, or elliptical), a divergence, or a signal cutoff.

In one embodiment, the raster image includes a two-dimensional representation of a virtual three-dimensional cylindrical surface of the object, for example object 1316. The virtual three-dimensional scene is projected on to a virtual three-dimensional cylindrical surface, which is then unwrapped to form a two-dimensional rectangle that contains a representation of the virtual three-dimensional cylindrical surface.

The raster image generator 1420 renders, onto the geometric viewport, a distinct raster image representing an object, for example 1316. The AV sensor configurator 1328 determines a representational quality of the distinct raster image associated with the reflectance of a surface of the object 1316. In one embodiment, the representational quality is used to classify the surface of the object 1316 as one that provides specular reflection or one that provides diffuse reflection. For specular surfaces, such as glass or polished metal, the reflectance is low at all angles except at the appropriate reflected angle. On the other hand, for diffuse surfaces, such as white paint, reflectance is more uniform. Thus, the reflectance of the surface of the object 1316 may be used to aid in object recognition and navigation within the environment 1304. In another embodiment, the representational quality of the distinct raster image associated with the reflectance of the surface of the object 1316 is used to identify water bodies or water puddles on a roadway, such as to prevent hydroplaning by the AV 1308. A water puddle on a roadway may have high reflectance only at certain wavelengths, while ice and snow generally have high reflectance across all visible wavelengths.

The sensor configuration generation module 1424 uses the simulation of the virtual sensors to generate an optimal spatiotemporal configuration for the visual sensors 1344. The sensor configuration generation module 1424 is communicatively coupled to the virtual point cloud generator 1416 and the communication interface 1428 to generate the optimal spatiotemporal configuration. Portions of the sensor configuration generation module 1424 may be implemented in software or hardware. For example, the sensor configuration generation module 1424 or a portion of the sensor configuration generation module 1424 may be part of a PC, a tablet PC, an STB, a smartphone, an internet of things (IoT) appliance, or any machine capable of executing instructions that specify actions to be taken by that machine.

The sensor configuration generation module 1424 determines, based on the virtual point cloud of the virtual sensor, an optimal spatiotemporal configuration of the visual sensors 1344 of the AV 1308. In one embodiment, the sensor configuration generation module 1424 uses the virtual point cloud to determine parameters of a visual sensor 1344, such as a LIDAR. For example, features extracted from the virtual point cloud are matched to features extracted from the sensor data 1352 that represents the object 1316. The spatiotemporal configuration of the visual sensors 1344 of the AV 1308 may thus be fine-tuned via regression analysis and simulation. In one embodiment, the resulting optimal spatiotemporal configuration of the visual sensors 1344 of the AV 1308 specifies a wide-angle-emitting visual sensor 1344 and wide-angle optics to focus the backscattered light and obtain the time-of-flight data for modeling the environment 1304.

In one embodiment, the sensor configuration generation module 1424 determines, based on the aggregate virtual point cloud, an optimal spatiotemporal configuration of a plurality of visual sensors 1344 of the AV 1308. Each visual sensor 1344 corresponds to a virtual sensor of the plurality of virtual sensors modeled by the virtual AV model generator 1400. For example, the spatiotemporal configuration of the plurality of visual sensors 1344 may specify whether each visual sensor 1344 is laser-diode-based or uses an uncooled fiber laser. The spatiotemporal configuration may specify whether each visual sensor 1344 has the ability to split and route its high-power beams to multiple locations, etc. The spatiotemporal configuration may specify an optimal layout of a plurality of visual sensors 1344.

In one embodiment, the sensor configuration generation module 1424 determines, based on the virtual point cloud of the virtual sensor, a blind spot of a visual sensor 1344 of the AV 1308. The blind spot is a spatiotemporal location of the environment 1304 around the AV 1308 that cannot be directly observed by the visual sensors 1344 while the AV 1308 is navigating. For example, the sensor configuration generation module 1424 may use the data points in the virtual point cloud to identify areas of low visibility such as where lighting conditions blur the contrast between an object and its surroundings or areas blocked by other objects such as cargo. To identify the blind spot, the sensor configuration generation module 1424 determines when an object, such as object 1316, is located at the blind spot. The plurality of coordinate positions that represent the portion of the environment 1304 that is located within the virtual viewing range of the virtual sensor is free of the object 1316. Hence, the virtual point cloud does not contain the coordinate positions corresponding to the object 1316.

In one embodiment, the sensor configuration generation module 1424 extends the viewing range of a visual sensor 1344 of the AV 1308 based on analyzing the virtual point cloud data of the virtual sensor. By extending the viewing range of the visual sensor 1344, the sensor configuration generation module 1424 enables the visual sensors 1344 to generate a more-complete point cloud of the environment by reducing the time needed to sample the environment 1344. For example, the spatiotemporal configuration of a visual sensor 1344 may angle each of the emitters and receivers above or below the horizontal to blanket more of the environment 1344 in the field of view of virtual lasers within the virtual sensor.

In an embodiment, the optimality or effectiveness of a spatiotemporal configuration of sensors can be determined by using numerical (or eyeballing) methods. For example, such methods are based on the visibility and range of simulated LIDAR point cloud. In one embodiment, the sensor configuration generation module 1424 determines an optimal spatiotemporal configuration of the plurality of spatiotemporal configurations based on the plurality of raster images. For example, based on the plurality of raster images, the sensor configuration generation module 1424 may determine an optimal number of visual sensors 1344 for the AV 1308. LIDAR sensors are expensive, difficult to manufacture at scale, and may lack the robustness necessary to account for potholes and extreme temperatures. The disclosed embodiments therefore determine an optimal number of LIDAR sensors to navigate the environment 1304 and identify objects such as 1316, while reducing the cost of deployment.

The communication interface 1428 communicates data such as a spatiotemporal configuration of the visual sensors 1344, determined blind spot locations for the AV 1308, coordinate positions of the objects 1316, 1320, raster images representing the coordinate positions of the objects 1316, 1320, or a geometric position and directional orientation of a visual sensor 1344 relative to the coordinate positions of an object 1316. In one embodiment, the communication interface 1428 communicates instructions including an optimal spatiotemporal configuration of the visual sensors 1344 to the AV 1308. The AV 1308 uses the instructions to configure and position its visual sensors 1344 according to the optimal spatiotemporal configuration to increase driving efficiency and safety.

The communication interface 1428 may be an example of the communication device 140 shown in FIG. 1. The communication interface 1428 is communicatively coupled to the AV 1308 across a network. In an embodiment, the communication interface 1428 communicates across the Internet, electromagnetic spectrum (including radio and optical communications) or other media (e.g., air and acoustic media). Portions of the communication interface 1428 may be implemented in software or hardware. For example, the communication interface 1428 or a portion of the communication interface 1428 may be part of a PC, a tablet PC, an STB, a smartphone, an IoT appliance, or any machine capable of executing instructions that specify actions to be taken by that machine.

Segregation of a Virtual Viewing Range and a Geometric Viewport

FIG. 15A illustrates a geometric viewport 1500 for determination of an optimal spatiotemporal sensor configuration for navigation of the AV 1308 using simulation of virtual sensors, in accordance with one or more embodiments. The geometric viewport 1500 has a rectangular shape. The rectangular viewport 1500 is used for rendering a representation of the objects 1316, 1320 as an image. In one embodiment, the rectangular viewport 1500 includes an area of interest for the virtual sensor expressed in coordinates, such as in meters or GNSS coordinates. The rectangular viewport 1500 has a height 1504 corresponding to a number of rays emitted from the virtual sensor. The rectangular viewport 1500 has a width 1508 that increases as a number of the frustums increases. The number of rays emitted by the virtual sensor and the density of sensor returns correspond to the resolution of the LIDAR and allow the LIDAR to provide a three-dimensional view of the environment 1304.

FIG. 15B illustrates a virtual viewing range 1530 for determination of an optimal spatiotemporal sensor configuration for navigation of the AV 1308 using simulation of virtual sensors, in accordance with one or more embodiments. The virtual viewing range 1530 of the virtual sensor is segregated into a plurality of frustums, for example, 1534, 1538, and 1542. The virtual viewing range 1530 of the virtual sensor corresponds to a viewing range of a visual sensor 1344 of the AV 1308 operating in the environment 1304. Segregating the geometric viewport 1500 into a plurality of sections includes mapping a near plane of each frustum, such as 1546, 1550, and 1554 of the plurality of frustums onto a corresponding section of the plurality of sections.

FIG. 15C illustrates segregation of the rectangular viewport 1500 for determination of an optimal spatiotemporal sensor configuration for navigation of the AV 1308 using simulation of virtual sensors, in accordance with one or more embodiments. The rectangular viewport 1500 is segregated into a plurality of sections, for example, sections 1560, 1564, and 1568. Each section, for example 1560, corresponds to a frustum, for example 1534.

Figure 16:
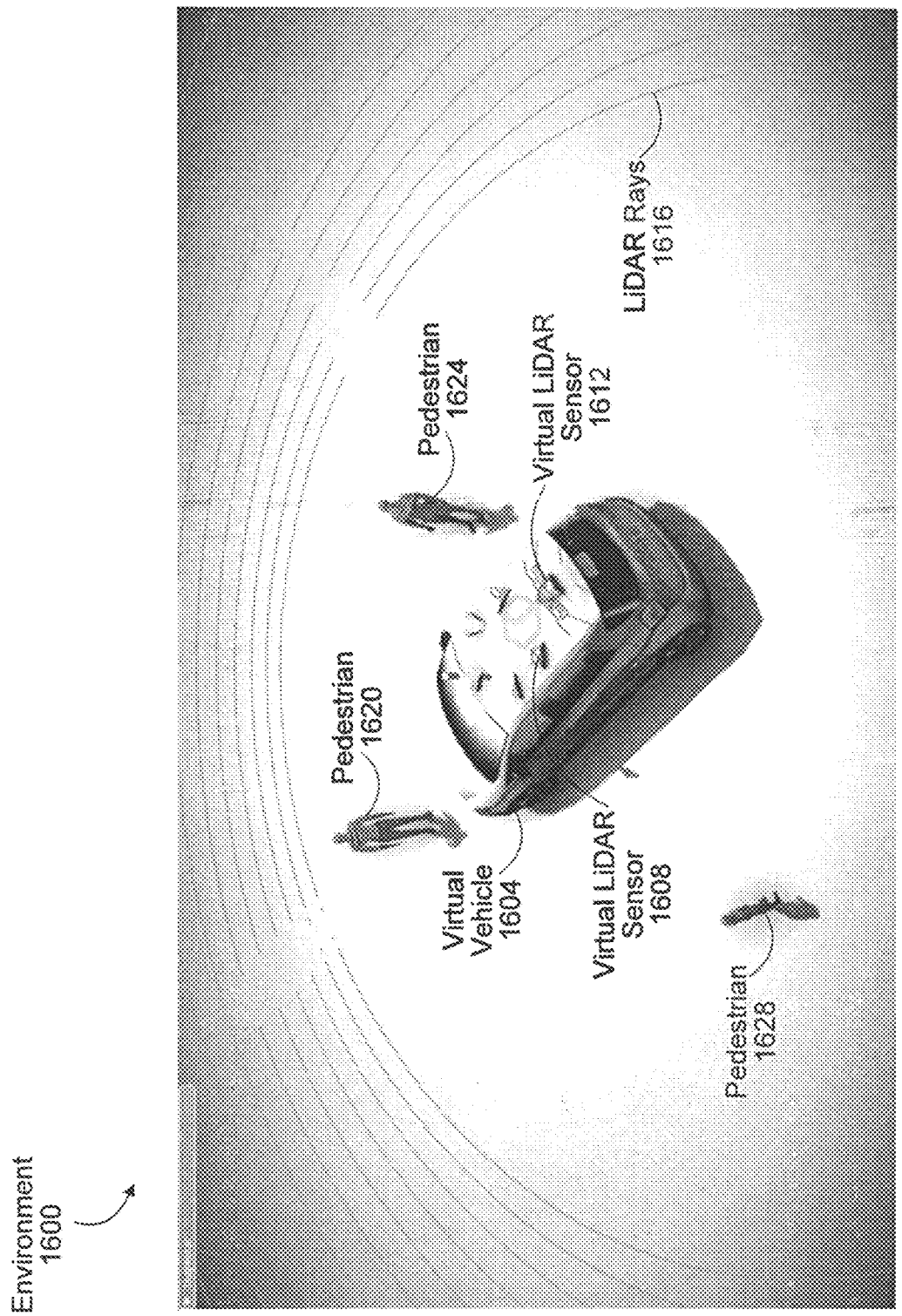
FIG. 16 illustrates an example environment for determination of an optimal spatiotemporal sensor configuration for navigation of an AV using simulation of virtual sensors, in accordance with one or more embodiments.

Example Environment for Determination of an Optimal Spatiotemporal Sensor Configuration FIG. 16 illustrates an example environment 1600 for determination of an optimal spatiotemporal sensor configuration for navigation of an AV using simulation of virtual sensors, in accordance with one or more embodiments. The virtual AV model generator 1400 generates a model of a virtual vehicle 1604 operating in the environment 1600. The model of the virtual vehicle includes virtual sensors 1608, 1612.

In one embodiment, the virtual sensor 1608 includes a topographic LIDAR, a bathymetric LIDAR, or a terrestrial LIDAR. In a topographic LIDAR, a pulsed laser is optically coupled to a beam director, which scans the laser pulses over a swath of terrain, usually centered on, and co-linear with, a trajectory of the vehicle on which the LIDAR is mounted. Unlike a topographic LIDAR, which uses an infrared wavelength of light, a bathymetric LIDAR typically uses a green wavelength of light to scan water bodies. A terrestrial LIDAR is a land-based laser scanner which, combined with a differential GNSS, enables the production of three-dimensional computer models. Each of the virtual sensors 1608, 1612 has a virtual viewing range. The virtual viewing range segregator segregates the virtual viewing range of the virtual sensors 1608, 1612 into a plurality of frustums. The virtual viewing range of the virtual sensor 1608 corresponds to a viewing range of a sensor 1344 of the AV operating in the environment 1600.

The geometric viewport generator 1408 generates a geometric viewport, for example the viewport 1500 illustrated and described above with reference to FIG. 15A. The geometric viewport has a height, for example height 1504, corresponding to a number of rays 1616 emitted from the virtual sensor. The raster image generator 1420 generates a raster image rendered onto the geometric viewport 1500. The raster image includes a plurality of pixels of the geometric viewport 1500 and represents coordinate positions of objects located within the environment 1600, for example, pedestrians 1620, 1624, and 1628.

In one embodiment, the model of the virtual vehicle 1604, including the virtual sensors 1608, 1612, is simulated to determine the quality of the sensor data 1352 obtained and to determine which sensors are best suited to different operating conditions for the AV 1604 under different environmental conditions. For example, one type of sensor may perform better than another type of sensor in urban environments that contain many buildings, construction zones, or pedestrians. Similarly, one type of sensor may perform better than another type of sensor in rainy or snowy weather when there are puddles of water on the ground surface.

The AV sensor configurator 1328 receives data describing the environment 1600 in which the AV 1604 is operating. The data describing the environment 1600 may include a pattern of weather, such as the temperature, whether it is a rainy or snowy day, and the visibility. The data describing the environment 1600 may also include parameters describing a density of the environment 1600, such as a number of buildings per square mile, the amount of the environment 1600 that is covered by road surface, a number of pedestrians, for example pedestrian 1620, 1624, 1628, an amount of vegetation per square mile, etc.

For each sensor of the visual sensors 1344, the virtual AV model generator 1400 generates a model of the virtual AV 1604 operating in the environment 1600. The model of the virtual AV 1604 includes at least one virtual sensor 1608. Using the received data describing the environment 1600, a virtual point cloud of the virtual sensor 1608 is rendered. In one embodiment, the model of the virtual AV 1604 includes a position of the virtual sensor 1608. For example, the position of the virtual sensor 1608 may be denoted by rectangular coordinates within the environment 1600, a spatiotemporal configuration relative to the AV 1604, or by a distance from the pedestrian 1620. The AV sensor configurator 1328 renders the virtual point cloud of the virtual sensor 1608 by projecting a geometric shape that intersects a virtual laser generated by the virtual sensor 1608. For example, the AV sensor configurator 1328 may project one or more triangles that intersect a virtual laser beam generated by the virtual sensor 1608. The AV sensor configurator 1328 determines a position of the geometric shape, for example, the one or more triangles, relative to the position of the virtual sensor 1608. The position of the geometric shape is then used to form the virtual point cloud data. Further details on the virtual point cloud generation are described above with reference to FIG. 14.

Referring back to FIG. 16, in one embodiment, the virtual sensor 1608 is a virtual spinning LIDAR. A spinning LIDAR has a 360° field of view because a single spinning LIDAR can be mounted on the roof of the AV 1604 to obtain a complete view of the surroundings of the AV 1604. The AV sensor configurator 1328 renders the virtual point cloud of the virtual sensor 1608 (spinning LIDAR) by simulating rotational movement of a motor of the virtual spinning LIDAR 1608. For example, the rotational movement of the virtual spinning LIDAR 1608 may include a +15° to −25° vertical field of view, a range of 300 m, an angular resolution of 0.10°, and a mapping rate of 8 million points per second.

In one embodiment, the AV sensor configurator 1328 renders the virtual point cloud of the virtual sensor 1608 by segregating a virtual viewing range of the virtual sensor 1608 into a plurality of frustums (e.g., frustums 1534, 1538), as described and illustrated above with reference to FIG. 15B. The plurality of frustums are used in the generation of the virtual point cloud of the virtual sensor 1608. In one embodiment, the AV sensor configurator 1328 renders the virtual point cloud of the virtual sensor 1608 by generating a geometric viewport, such as the viewport 1500 illustrated and described above with reference to FIG. 15A. The geometric viewport includes a plurality of pixels. The geometric viewport has a height corresponding to a number of rays emitted from the virtual sensor 1608. The geometric viewport is used to generate the virtual point cloud of the virtual sensor 1608. The raster image generator 1420 renders a raster image representing a plurality of coordinate positions of the environment 1600, as described above with reference to FIG. 14. The raster image includes the plurality of pixels of the geometric viewport and represents coordinate positions of an object, for example pedestrian 1620 located within the environment 1600.

In one embodiment, the AV sensor configurator 1328 renders the virtual point cloud of the virtual sensor 1608 by segregating a geometric viewport into a plurality of sections, as illustrated and described above with reference to FIGS. 14 and 15C. Each section of the plurality of sections corresponds to a frustum of a plurality of frustums of a virtual viewing range of the virtual sensor 1608. The AV sensor configurator 1328 generates, using the plurality of sections of the geometric viewport, the virtual point cloud of the virtual sensor 1608. In one embodiment, the geometric viewport has a width that increases as a number of the plurality of frustums increases. In one embodiment, the segregating of the geometric viewport into the plurality of sections includes mapping a near plane of each frustum of the plurality of frustums onto a corresponding section of the plurality of sections, as described and illustrated above with reference to FIGS. 14 and 15B.

Referring now to FIG. 16, a quality metric of the virtual sensor 1608 is determined using the virtual point cloud. The quality metric reflects the range and visibility of the virtual sensor 1608 and is used to compare different types of visual sensors under different operating conditions of the AV 1604. The quality metric may be expressed as a vector of different components, for example, viewing range, or a weighted aggregate of the components. Certain components that are more important on rainy days, for example determining a reflectance of a surface of an object may be weighted higher than other components of the quality metric.

In one embodiment, the quality metric includes a range of the virtual sensor 1608 or a visibility of the virtual sensor 1608. The range and visibility of the virtual sensor 1608 may depend on a speed at which an object, for example pedestrian 1620 is scanned. Certain virtual sensors may include oscillating plane mirrors, a polygonal mirror, or a dual-axis scanner that increase the range in certain weather conditions. In one embodiment, the quality metric includes a point density of the virtual point cloud. The point density refers to an average number of points per unit area, which may be expressed as points per square meter. The point density may also be determined as an average distance between points (nominal point spacing).

In one embodiment, the quality metric includes a vertical accuracy of the virtual sensor 1608. The vertical accuracy is expressed as the root mean square error (RMSE) and is a measure of the absolute deviation of the point cloud data from a known vertical datum, such as a surveyed location. In one embodiment, the quality metric includes a precision of the virtual sensor 1608, which refers to the repeatability of a sensor measurement. The quality metric may be affected by the types of light that the virtual sensor 1608 uses to image an object, for example pedestrian 1620. For example, a typical LIDAR uses ultraviolet, visible, or near infrared light to image objects. The quality metric may include the range of materials, including metals, non-metallic objects, or rocks that the virtual sensor can detect.

In one embodiment, the AV sensor configurator 1328 determines the quality metric of the virtual sensor 1608 by determining, using the virtual point cloud of the virtual sensor 1608, a size of a blind spot of the sensor of the AV 1604. Determination of a blind spot of a virtual sensor is described in detail above with reference to FIG. 14. Referring now to FIG. 16, the pedestrian 1628 may be located in a blind spot of the virtual sensor 1608. The blind spot includes a plurality of coordinate positions of the environment 1600. If the pedestrian 1628 is located in a blind spot, the plurality of coordinate positions sensed by the virtual sensor 1608 will be free of the pedestrian 1628. The size of a blind spot of a sensor affects sensor quality and the viewing range. For example, a blind spot located where a pedestrian or another vehicle suddenly crosses a street may lead to a collision with the AV. Therefore, the quality metric is based on the size of the blind spot of the virtual sensor 1608.

In one embodiment, the AV sensor configurator 1328 determines the quality metric of the virtual sensor 1608 by rendering, using a timestamp, a state of the environment 1600. For example, two-dimensional LIDAR data may be rendered in a floating point binary format and the timestamp of the two-dimensional LiDAR data 1352 is stored. A virtual viewing range of the virtual sensor 1608 at the timestamp is determined. The different virtual sensor types may be compared using the virtual viewing ranges to determine which sensor type is best suited to the environment 1600. In one embodiment, the AV sensor configurator 1328 determines the quality metric of the virtual sensor 1608 by rendering, using the virtual point cloud of the virtual sensor 1608, a raster image describing the environment 1600. Using the raster image, a reflectance of a surface of an object, for example pedestrian 1620 in the environment 1600 is determined. The performance of the virtual sensor 1608 in the presence of objects having a higher reflectance can affect the range and visibility on rainy days. Generation of the raster image and determination of reflectance is described in detail above with reference to FIG. 14.

Using the plurality of quality metrics across the different virtual sensors, a range of different sensor types are evaluated. An optimal sensor for operating the vehicle within the environment 1600 is selected. For example, a spinning LIDAR may be better suited to certain environmental conditions than a solid-state LIDAR or a smart camera.

Process for Determination of an Optimal Spatiotemporal Sensor Configuration for an AV FIG. 17 illustrates a process 1700 for determination of an optimal spatiotemporal sensor configuration for navigation of the AV 1308 using simulation of virtual sensors, in accordance with one or more embodiments. In one embodiment, the process of FIG. 1700 is performed by the AV sensor configurator 1328. Other entities, for example, one or more components of the AV 1308 perform some or all of the steps of the process 1700 in other embodiments. Likewise, embodiments may include different and/or additional steps, or perform the steps in different orders.

The AV sensor configurator 1328 generates 1704 a model of a virtual vehicle operating in the environment 1304. The model of the virtual vehicle includes a virtual sensor having a virtual viewing range. In one embodiment, the virtual sensor includes a number of virtual lasers separated into a number of groups. Each group of virtual lasers is angled and spaced from each other group as well as from the virtual viewing range. The individual virtual lasers are angled based on the virtual viewing range and the number of virtual lasers. Thus, different sensors and different sets of lasers and angles are modeled.

The AV sensor configurator 1328 segregates 1708 the virtual viewing range, for example 1530, of the virtual sensor into a plurality of frustums. The virtual viewing range 1530 of the virtual sensor corresponds to a viewing range of a visual sensor 1344 of the AV 1308 operating in the environment 1304. The virtual sensor sweeps or scans in a direction of the beam or rays, thus generating a collection of distance measurements within the virtual viewing range 1530. The virtual viewing range 1530 is a range of horizontal and vertical angles through which the virtual sensor captures virtual sensor data. Each frustum is a portion of a solid shape, such as a cone or a pyramid that lies between one or two parallel planes cutting the solid shape.

The AV sensor configurator 1328 generates 1712 a geometric viewport, for example 1500, including a plurality of pixels. The geometric viewport 1500 has a height, for example 1504, corresponding to a number of rays emitted from the virtual sensor. The geometric viewport 1500 is a viewing region having a polygonal shape used for rendering a representation of the objects 1316, 1320 as an image. For example, a plurality of pixels is used to express the screen coordinates in which the objects 1316, 1320 are rendered.

The AV sensor configurator 1328 segregates 1716 the geometric viewport 1500 into a plurality of sections, for example, sections 1560, 1564. Each section of the plurality of sections corresponds to a frustum of the plurality of frustums. Each section of the geometric viewport 1500 is a virtual area used by the raster image generator 1420 to scale and size a raster image when rendering the raster image to the geometric viewport 1500. In one embodiment, each section of the geometric viewport corresponds to a region of the environment 1304 that is rendered on the geometric viewport.

The AV sensor configurator 1328 renders 1720 a virtual point cloud of the virtual sensor, wherein the virtual point cloud includes a plurality of coordinate positions representing a portion of the environment 1304 located within the virtual viewing range of the virtual sensor. The AV sensor configurator 1328 uses parameters of the virtual sensor to tune the virtual sensor model and render the virtual point cloud. For example, the AV sensor configurator 1328 may vary the scan angle, pulse rate frequency, sidelap, or mean point density of the virtual sensor to render the virtual point cloud.

The AV sensor configurator 1328 determines 1724, based on the virtual point cloud of the virtual sensor, an optimal spatiotemporal configuration of the visual sensor 1344 of the AV 1308. In one embodiment, the AV sensor configurator 1328 uses the virtual point cloud to determine parameters of the visual sensor 1344, such as a LIDAR. For example, features extracted from the virtual point cloud may be matched to features extracted from the sensor data 1352 that represent the objects 1316. The spatiotemporal configuration of the visual sensors 1344 of the AV 1308 are thus fine-tuned via regression analysis and simulation.

Process for Determining an Optimal Sensor

FIG. 18 illustrates a process 1800 for determining an optimal sensor for navigation of an AV 1308 using simulation of virtual sensors, in accordance with one or more embodiments. In one embodiment, the process of FIG. 1800 is performed by the AV sensor configurator 1328. Other entities, for example, one or more components of the AV 1308 perform some or all of the steps of the process 1800 in other embodiments. Likewise, embodiments may include different and/or additional steps, or perform the steps in different orders.

The AV sensor configurator 1328 receives 1804, using one or more processors, data describing an environment 1304 in which the AV 1308 is operating. The data describing the environment 1304 may include a pattern of weather, such as the temperature, whether it is a rainy or snowy day, and the visibility. The data describing the environment 1304 may also include parameters describing a density of the environment 1304, such as a number of buildings per square mile, the amount of the environment 1304 that is covered by road surface, a number of pedestrians, an amount of vegetation per square mile, etc.

For each sensor of a plurality of sensors 1344 of the AV 1308, the AV sensor configurator 1328 generates 1808, using the one or more processors, a model of a virtual AV operating in the environment 1304. The model of the virtual AV includes a virtual sensor corresponding to the sensor.

The AV sensor configurator 1328 renders 1812, using the received data describing the environment 1304, a virtual point cloud of the virtual sensor. In one embodiment, the model of the virtual AV includes a position of the virtual sensor. For example, the position of the virtual sensor may be denoted by rectangular coordinates within the environment 1304, a spatiotemporal configuration relative to the AV 1308, or by a distance from an object 1316. The AV sensor configurator 1328 renders the virtual point cloud of the virtual sensor by projecting a geometric shape that intersects a virtual laser generated by the virtual sensor. The AV sensor configurator 1328 determines a position of the geometric shape relative to the position of the virtual sensor. The position of the geometric shape is then used to form the virtual point cloud data.

The AV sensor configurator 1328 determines 1816, using the virtual point cloud, a quality metric of the virtual sensor. The quality metric reflects the range and visibility of the virtual sensor and is used to compare different types of visual sensors under different operating conditions of the AV 1308. The quality metric may be expressed as a vector of different components, for example, viewing range, or a weighted aggregate of the components. Certain components that are more important on rainy days, for example determining a reflectance of a surface of an object may be weighted higher than other components of the quality metric.

The AV sensor configurator 1328 selects 1820, using the plurality of quality metrics, an optimal sensor of the plurality of sensors 1344 for operating the AV 1308 within the environment 1304.

Additional Embodiments

In some embodiments, one or more processors of a vehicle are used receive data describing an environment in which the vehicle is operating. For each of multiple sensors of the vehicle, the one or more processors generate a model of a virtual vehicle operating in the environment. The model of the virtual vehicle includes a virtual sensor corresponding to the sensor. The received data describing the environment is used to render a virtual point cloud of the virtual sensor. The virtual point cloud is used to generate a quality metric of the virtual sensor. The quality metric includes a range of the virtual sensor or a visibility of the virtual sensor. The quality metrics are used to select an optimal sensor of the multiple sensors for operating the vehicle within the environment.

In some embodiments, the quality metric further includes a point density of the virtual point cloud.

In some embodiments, the quality metric further includes a vertical accuracy of the virtual sensor.

In some embodiments, the quality metric further includes a precision of the virtual sensor.

In some embodiments, the quality metric further includes a virtual viewing range of the virtual sensor.

In some embodiments, the determining of the quality metric of the virtual sensor includes rendering, using a timestamp, a state of the environment. The one or more processors determine the virtual viewing range of the virtual sensor at the timestamp.

In some embodiments, the determining of the quality metric of the virtual sensor includes determining, using the virtual point cloud of the virtual sensor, a size of a blind spot of the sensor of the vehicle.

In some embodiments, the blind spot includes multiple coordinate positions of the environment. An object is located at the blind spot. The multiple coordinate positions are free of the object.

In some embodiments, the virtual sensor includes a topographic LIDAR, a bathymetric LIDAR, or a terrestrial LIDAR.

In some embodiments, the model of the virtual vehicle further includes a position of the virtual sensor. The rendering of the virtual point cloud of the virtual sensor includes projecting, using the one or more processors, a geometric shape that intersects a virtual laser generated by the virtual sensor. The one or more processors determine a position of the geometric shape relative to the position of the virtual sensor.

In some embodiments, the virtual sensor is a virtual spinning LIDAR. The rendering of the virtual point cloud of the virtual sensor includes simulating, using the one or more processors, rotational movement of a motor of the virtual spinning LIDAR.

In some embodiments, the determining of the quality metric of the virtual sensor includes rendering, using the virtual point cloud of the virtual sensor, a raster image describing the environment. The raster image is used to determine a reflectance of a surface of an object in the environment.

In some embodiments, the rendering of the virtual point cloud of the virtual sensor includes segregating, using the one or more processors, a virtual viewing range of the virtual sensor into multiple frustums. The virtual viewing range of the virtual sensor corresponds to a viewing range of the sensor of the vehicle. The frustums are used to generate the virtual point cloud of the virtual sensor.

In some embodiments, the rendering of the virtual point cloud of the virtual sensor includes generating, using the one or more processors, a geometric viewport including multiple pixels. The geometric viewport has a height corresponding to a number of rays emitted from the virtual sensor. The geometric viewport is used to generate the virtual point cloud of the virtual sensor.

In some embodiments, a raster image is rendered representing multiple coordinate positions of the environment. The raster image includes the multiple pixels of the geometric viewport and represents coordinate positions of an object located within the environment.

In some embodiments, the rendering of the virtual point cloud of the virtual sensor includes segregating, using the one or more processors, a geometric viewport into multiple sections. Each section corresponds to a frustum of multiple frustums of a virtual viewing range of the virtual sensor. The multiple sections of the geometric viewport are used to generate the virtual point cloud of the virtual sensor.

In some embodiments, the geometric viewport has a width that increases as a number of the frustums increases.

In some embodiments, the segregating of the geometric viewport into the multiple sections includes mapping a near plane of each frustum of the multiple frustums onto a corresponding section of the multiple sections.

In some embodiments, the raster image is used to determine a reflectance of a surface of the object. A control module of the vehicle is used to operate the vehicle to avoid a collision of the vehicle with the object based on the reflectance.

In some embodiments, a distinct raster image representing the object is rendered onto the geometric viewport. A representational quality of the distinct raster image associated with the reflectance of a surface of the object is determined.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   generating, using one or more processors of a vehicle operating in an environment, a model of a virtual vehicle operating in the environment, the model of the virtual vehicle comprising a virtual sensor having a virtual viewing range;
   segregating, using the one or more processors, the virtual viewing range of the virtual sensor into a plurality of frustums, the virtual viewing range of the virtual sensor corresponding to a viewing range of a sensor of the vehicle;
   generating, using the one or more processors, a geometric viewport comprising a plurality of pixels, the geometric viewport having a height corresponding to a number of rays emitted from the virtual sensor;

segregating, using the one or more processors, the geometric viewport into a plurality of sections, each section of the plurality of sections corresponding to a frustum of the plurality of frustums; and rendering, using the one or more processors, a virtual point cloud of the virtual sensor, the virtual point cloud comprising a plurality of coordinate positions representing a portion of the environment located within the virtual viewing range of the virtual sensor.

2. The method of claim 1, further comprising determining, using the one or more processors, a spatiotemporal configuration of the sensor of the vehicle based on the virtual point cloud of the virtual sensor.

3. The method of claim 1, further comprising:

rendering, using the one or more processors, a plurality of virtual point clouds of a plurality of virtual sensors of the virtual vehicle;

aggregating, using the one or more processors, the plurality of virtual point clouds into an aggregate virtual point cloud, the aggregate virtual point cloud representing a portion of the environment located within a virtual viewing range of the plurality of virtual sensors; and determining, using the one or more processors, a spatiotemporal configuration of a plurality of sensors of the vehicle based on the aggregate virtual point cloud, each sensor of the plurality of sensors corresponding to a virtual sensor of the plurality of virtual sensors.

4. The method of claim 1, further comprising, using the one or more processors, determining a blind spot of the sensor of the vehicle based on the virtual point cloud of the virtual sensor, the blind spot comprising a spatiotemporal location of the environment.

5. The method of claim 4, wherein an object is located at the blind spot and the plurality of coordinate positions is free of the object.

6. The method of claim 1, further comprising extending, using the one or more processors, the viewing range of the sensor of the vehicle based on analyzing the virtual point cloud data of the virtual sensor.

7. The method of claim 1, wherein the sensor comprises at least one of a LIDAR, a monocular video camera, a stereo video camera, an infrared camera, a RADAR, an ultrasonic sensor, or a time-of-flight (TOF) depth sensor.

8. The method of claim 1, wherein the sensor is one of a plurality of sensors located on the vehicle and arranged in a spatiotemporal configuration.

9. The method of claim 8, wherein the spatiotemporal configuration is one of a plurality of spatiotemporal configurations, the method further comprising:

for each spatiotemporal configuration of the plurality of spatiotemporal configurations, rendering, using the one or more processors, a raster image representing the plurality of coordinate positions based on the virtual point cloud of the virtual sensor; and determining, using the one or more processors, an optimal spatiotemporal configuration of the plurality of spatiotemporal configurations based on the plurality of raster images.

10. The method of claim 9, wherein each raster image of the plurality of raster images comprises the plurality of pixels of the geometric viewport and represents coordinate positions of an object located within the environment.

11. The method of claim 10, further comprising transmitting, using the one or more processors, the raster image to a display device of the vehicle, the raster image representing the coordinate positions of the object located within the environment.

12. The method of claim 9, wherein the rendering of the raster image comprises:

receiving, using the sensor, sensor data representing coordinate positions of the object located within the environment;

generating, using the one or more processors, pixels representing the object; and combining, using the one or more processors, the sensor data with the pixels to generate the raster image.

13. The method of claim 12, wherein the sensor data comprises LIDAR point cloud data.

14. The method of claim 9, wherein the rendering of the raster image is based on a geometric position and directional orientation of the sensor relative to the coordinate positions of the object.

15. The method of claim 9, wherein the raster image comprises a two-dimensional representation of a three-dimensional surface of the object.

16. The method of claim 9, further comprising:

determining, using the one or more processors, a distance from the vehicle to the object based on the coordinate positions of the object in the raster image; and operating, using a control module of the vehicle, the vehicle to avoid a collision with the object based on the distance.

17. The method of claim 1, wherein the geometric viewport has a width that increases as a number of the plurality of frustums increases.

18. The method of claim 1, wherein the segregating of the geometric viewport into the plurality of sections comprises mapping, using the one or more processors, a near plane of each frustum of the plurality of frustums onto a corresponding section of the plurality of sections.

19. A vehicle comprising:

one or more computer processors; and one or more computer-readable, non-transitory storage media storing instructions which, when executed by the one or more computer processors, cause the one or more computer processors to:

generate a model of a virtual vehicle operating in an environment, the model of the virtual vehicle comprising a virtual sensor having a virtual viewing range;

segregate the virtual viewing range of the virtual sensor into a plurality of frustums, the virtual viewing range of the virtual sensor corresponding to a viewing range of a sensor of the vehicle;

generate a geometric viewport comprising a plurality of pixels, the geometric viewport having a height corresponding to a number of rays emitted from the virtual sensor;

segregate, the geometric viewport into a plurality of sections, each section of the plurality of sections corresponding to a frustum of the plurality of frustums; and render a virtual point cloud of the virtual sensor, the virtual point cloud comprising a plurality of coordinate positions representing a portion of the environment located within the virtual viewing range of the virtual sensor.

20. One or more computer-readable, non-transitory storage media storing instructions which, when executed by one or more computing devices, cause the one or more computing devices to:

generate a model of a virtual vehicle operating in an environment, the model of the virtual vehicle comprising a virtual sensor having a virtual viewing range;

segregate the virtual viewing range of the virtual sensor into a plurality of frustums, the virtual viewing range of the virtual sensor corresponding to a viewing range of a sensor of the vehicle;

generate a geometric viewport comprising a plurality of pixels, the geometric viewport having a height corresponding to a number of rays emitted from the virtual sensor;

segregate, the geometric viewport into a plurality of sections, each section of the plurality of sections corresponding to a frustum of the plurality of frustums; and render a virtual point cloud of the virtual sensor, the virtual point cloud comprising a plurality of coordinate positions representing a portion of the environment located within the virtual viewing range of the virtual sensor.

* * * * *